US012012789B2

(12) United States Patent
McInnis et al.

(10) Patent No.: US 12,012,789 B2
(45) Date of Patent: Jun. 18, 2024

(54) MOTION-ACTIVATED STOP FOR A VENT WINDOW

(71) Applicant: Caldwell Manufacturing Company North America, LLC, Rochester, NY (US)

(72) Inventors: James M. McInnis, Hilton, NY (US); James David Card, Dansville, NY (US); Patrick E. Milligan, Rochester, NY (US); Matthew N. Brady, Spencerport, NY (US); Mark Thomas Halecki, Rochester, NY (US)

(73) Assignee: ASSA ABLOY Fenestration, LLC, Rochester, NY (US)

( * ) Notice: Subject to any disclaimer, the term of this patent is extended or adjusted under 35 U.S.C. 154(b) by 0 days.

(21) Appl. No.: 18/019,004

(22) PCT Filed: May 23, 2022

(86) PCT No.: PCT/US2022/030568
§ 371 (c)(1),
(2) Date: Jan. 31, 2023

(87) PCT Pub. No.: WO2022/251126
PCT Pub. Date: Dec. 1, 2022

(65) Prior Publication Data

US 2023/0287717 A1 Sep. 14, 2023

Related U.S. Application Data

(60) Provisional application No. 63/192,892, filed on May 25, 2021.

(51) Int. Cl.
*E05C 17/28* (2006.01)

(52) U.S. Cl.
CPC .................................... *E05C 17/28* (2013.01)

(58) Field of Classification Search
CPC ........... E05C 17/28; E05F 11/28; E05F 11/30; E05D 15/44
See application file for complete search history.

(56) References Cited

U.S. PATENT DOCUMENTS 4,718,144 A 1/1988 Buckley
5,615,522 A * 4/1997 Tomanek ................ E05C 9/066 52/72

(Continued)

FOREIGN PATENT DOCUMENTS

FR 2044568 A5 2/1971
GB 2228292 A * 8/1990 ............. E05C 17/28

OTHER PUBLICATIONS

International Search Report and Written Opinion of the ISA issued in International Application No. PCT/US2022/030568, mailed Sep. 20, 2022; ISA/EP.

(Continued)

*Primary Examiner* — Marcus Menezes
(74) *Attorney, Agent, or Firm* — Harness, Dickey & Pierce, P.L.C.

(57) ABSTRACT

A hardware assembly providing a motion-activated vent stop for a vent window assembly. The hardware assembly can detect excessive forces acting on the vent and quickly arrest any unintended or induced movement of the vent while enabling the regular function of the vent window under normal operating conditions. When an opening force acting on the vent exceeds a predetermined value, the resulting torque causes a shoe to pivot and engage a stepped profile of a guide slot of a track along which the shoe moves. Once engaged, the shoe cannot move along the track and continued movement of the vent is halted. The shoe includes a biasing member that engages the guide slot and produces a counter-torque that tends to bias the shoe generally verti- (Continued)

cally in the guide slot and enable the shoe to travel freely under normal operating conditions.

31 Claims, 21 Drawing Sheets

(56) References Cited

U.S. PATENT DOCUMENTS

| | | | | |
|---|---|---|---|---|
| 7,047,600 | B2 * | 5/2006 | Muir | E05D 15/30 16/346 |
| 7,690,154 | B2 | 4/2010 | Muir | |
| 8,359,711 | B2 * | 1/2013 | Isley | E05D 11/1007 16/362 |
| 9,371,672 | B2 | 6/2016 | Tseng et al. | |

OTHER PUBLICATIONS

Caldwell 2000SG Series Pamphlet; www.caldwellmfgco.com/Patents.asp, 2011.
Assa Abloy, Securistyle, Storm Balanced Friction Stay Pamphlet; www.securistyle.com, Feb. 2019.

* cited by examiner

MOTION-ACTIVATED STOP FOR A VENT WINDOW

CROSS-REFERENCE TO RELATED APPLICATIONS

This application is a U.S. National Phase Application under 35 U.S.C. 371 of International Application No. PCT/US2022/030568, filed May 23, 2022, which claims the benefit of U.S. Provisional Application No. 63/192,892, filed on May 25, 2021. The entire disclosures of the above applications are incorporated herein by reference.

FIELD

The present disclosure relates generally to window hardware assemblies for vent-style windows, including awning windows and casement windows and, more particularly, to window hardware assemblies for use with vent-style windows that inhibit window vents from opening under conditions of a rapid acceleration.

BACKGROUND

This section provides background information related to the present disclosure which is not necessarily prior art.

Vent-style windows typically include linkages that attach a window sash or vent to a window frame and enable the vent to be opened and closed in a hinged manner. Awning windows and casement windows are two well-known types of vent-style windows.

Awning-type windows are generally hinged at the top and open outward from the bottom. For example, the top portion of a window vent may be attached to the top portion of a window frame by a hinge, and the bottom portion of the vent may swing outward from the bottom of the frame while the top portion of the vent remains attached to the top portion of the frame. Thus, when an awning-type window is open, the vent may form an awning adjacent to and/or over the window opening. During inclement weather, this arrangement allows awning-type windows to protect the interior of a structure from precipitation while still allowing for ventilation.

During the construction of structures such as commercial buildings, large awning-type windows are often installed before construction of the remainder of the building is complete. Due to the dynamic nature of construction sites, the large awning-type windows may not always be latched or otherwise secured in a closed condition during the course of construction. Because the interior of partially-constructed buildings may be open to the exterior (i.e., outside) environment, strong winds and other environmental forces may apply unusually high forces to the vent, and may cause an unlatched or inadequately secured awning-type window to swing open rapidly. As the large awning-type windows installing in commercial buildings typically have high mass, the resultant momentum from the vent swinging open under rapid acceleration may cause the vent and/or window assembly to become damaged, resulting in increased material costs and construction delays for the builder.

It, therefore, would be advantageous to provide window hardware assemblies for vent-style windows that can inhibit or prevent the window from opening under conditions where the vent is subjected to forces causing the vent to move from a closed position toward an open position under rapid acceleration.

SUMMARY

This section provides a general summary of the disclosure, and is not a comprehensive disclosure of its full scope or all of its features.

The present disclosure provides a window hardware assembly comprising a motion-activated vent stop and/or vent retention system for a vent window assembly. Under certain environmental conditions, the vent window may be subjected to excessive forces that may induce the vent to move rapidly toward the OPENED position. In such circumstances, the vent window or the structure in which it is installed may become damaged. The window hardware assembly of the present disclosure can detect excessive forces acting on the vent and quickly arrest any unintended or induced movement of the vent. At the same time, the window hardware assembly enables the regular function of the vent window under normal operating conditions. The window hardware assembly can be reset and/or reused.

In one aspect of the disclosure, the window hardware assembly can be generally understood to include a vent bracket that is configured to attach to a vent. The vent bracket is pivotally connected to an end of a link. A track is mounted to the inside of the frame of the vent window and fixed in place. The track includes a guide slot. A stepped profile is formed in a wall of the guide slot. A shoe is pivotally connected to an end of the link opposite from the vent bracket. The shoe resides in the guide slot of the track. The shoe travels vertically along the track in the guide slot as the vent moves between the CLOSED and OPENED positions. A force acting on the vent (e.g., when opening and closing the vent) is translated to the shoe by the vent bracket and the link in the form of a torque applied to the shoe. Under conditions where the opening force acting on the vent exceeds a predetermined value (such as when the vent is subjected to an acceleration force), the resulting torque applied to the shoe causes the shoe to pivot in the guide slot and engage the stepped profile of the guide slot. Once engaged with the stepped profile of the guide slot, the shoe is prevented from continuing to travel along the track, thereby arresting any continued opening movement of the vent. In order to enable the shoe to easily travel along the guide slot under normal operating conditions, and to avert or inhibit an undesired premature actuation of the vent retention system, the shoe includes a biasing member. The biasing member engages the guide slot and produces a counter-torque acting on the shoe. The counter-torque tends to orient the shoe generally vertically in the guide slot under normal operating conditions. As a result, the shoe is nominally urged in a manner to avoid engaging the stepped profile. The counter-torque may be overcome, however, when the opening force acting on the vent exceeds the predetermined value.

In another aspect, the present disclosure provides a window hardware assembly. The window hardware assembly may include a track member having a recessed portion. The recessed portion may have a first wall opposite a second wall, and a plurality of steps formed on the second wall. A shoe assembly may be slidably received within the recessed portion of the track member. The shoe assembly may include a spring member coupled to a body. The spring member may contact the first wall at a contact point. A retaining pin may be coupled to the body at a position below the spring member. The spring member may apply a spring force vector to the body. The spring force vector may exert a torque in a first rotational direction on the shoe assembly. The retaining pin may exert a torque in a second rotational direction on the shoe assembly in response to a force component applied to the retaining pin. The second rotational direction may be opposite the first rotational direction. The force component may be in a same direction as the spring force vector. The shoe assembly may rotate in the second rotational direction in response to the force component applied to the retaining pin exceeding a threshold. A step of the plurality of steps may prevent the shoe assembly from sliding downward within the recessed portion of the track member when the shoe assembly is rotated in the second rotational direction.

In other features, the track member may include an aperture formed through the track member at the recessed portion. The body of the shoe assembly may include an aperture. In other features, the retaining pin may be received through the aperture of the track member and the aperture of the body of the shoe assembly to slidably couple the shoe assembly to the track member. In other features, each step of the plurality of steps may include a first surface and an angled second surface. The body of the shoe assembly may include a bottom surface. The bottom surface may be configured to catch on the first surface of one of the plurality of steps when the shoe assembly is rotated in the second rotational direction.

In other features, the window hardware assembly may include a linkage member pivotally coupled to the shoe assembly. In other features, the linkage member may be pivotally coupled to the retaining pin. In other features, the linkage member may be pivotally coupled to the retaining pin by a pivot pin received through an aperture at an end of the linkage member and an aperture formed through the retaining pin. In other features, an attachment member may be pivotally coupled to the linkage member. The attachment member may be configured to be coupled to a window sash. In other features, the attachment member may be pivotally coupled to the linkage member by a pivot pin received through an aperture at an end of the linkage member and an aperture formed through the attachment member. In other features, the spring member may be a linear wave spring.

In still another aspect, a window hardware assembly including a body having a first face opposite a second face and a first side opposite a second side, an aperture formed through the body, and a recessed portion formed in the first face of the body is also disclosed. The aperture may extend from the first face to the second face. The recessed portion may be concentric with the aperture. A retaining pin may be received through the aperture. A plurality of cutouts may be formed on the first side of the body. A spring member may be received in the plurality of cutouts.

In other features, the plurality of cutouts may include a first cutout and a second cutout. A first end of the spring member may be received in the first cutout and a second end of the spring member may be received in the second cutout. In other features, the spring member may be a linear wave spring.

In other features, the retaining pin may include a columnar center portion, a first retaining cap at a first end of the center portion, and a second retaining cap at a second end of the center portion. In other features, the first retaining cap may have a diameter greater than a diameter of the columnar center portion. In other features, the second retaining cap may have a diameter greater than a diameter of the columnar center portion. In other features, the first retaining cap may have a retaining surface facing the columnar center portion. In other features, the retaining pin may be disposed such that the retaining surface is in contact with a surface of the recessed portion.

A system for immobilizing a window sash in response to a force applied to the window sash is also disclosed. A first member may include a recessed portion, the recessed portion having a first wall opposite a second wall formed by a plurality of steps. Each step of the plurality of steps may be formed by an angled surface and a flat surface. The angled surface and the flat surface may meet at an apex or peak. The system may include a second member including a first side opposite a second side, and a top surface opposite a bottom surface. The second member may be slidably received within the recessed portion. A spring member may be coupled to the first side of the second member. The spring member may be in contact with the first wall. A pin may be received through an aperture formed in the second member.

The spring member may bias the second member away from the first member such that the second side of the second member is in contact with at least one apex of the plurality of steps. The second member may be configured to rotate in response to the force being applied to the pin when the force exceeds a threshold. The second member may be configured to slide freely within the recessed portion when the second member is not rotated. The bottom surface of the second member may be configured to catch on the flat surface of one of the plurality of steps when the second member is rotated.

In other features, the system may further include a linear member having a first end and a second end. The linear member may be pivotally coupled to the pin at the first end. A connecting member may be pivotally coupled to the linear member at the second end. The connecting member may be configured to be attached to the window sash. The force applied to the window sash may be transmitted from the window sash to the connecting member, from the connecting member to the linear member, and from the linear member to the pin.

In still other aspects of the disclosure, a motion-activated stop for a vent window having a window frame and a vent disposed in the window frame and moveable toward an opened position in response to an opening force being applied to the vent is provided. The motion-activated stop has a connector configured to attach to the vent, a link comprising a first end and a second end, wherein the first end is pivotally coupled to the connector, a track configured to attach to the window frame. The track extends along a longitudinal direction and has a recessed portion with a first wall and a second wall, the first wall being opposite the second wall and the second wall having a plurality of steps. A shoe assembly is received in the recessed portion of the track and configured to be movable along the track in a first direction when the vent is moved toward an opened position. The shoe assembly includes a body extending along the longitudinal direction from a first end to a second end, a biasing member comprising a proximal end engaging the body and a distal end engaging the first wall of the recessed portion, wherein the biasing member applies a first force to the body at a first location to create a first torque acting on the body, the first torque having a first rotational direction, and a retaining pin coupled to the body and spaced from the first location along the longitudinal direction. The second end of the link is pivotally coupled to the retaining pin.

In another aspect, when the opening force is applied the vent, the link is configured to transfer a second force to the retaining pin to create a second torque acting on the body, the second torque having a second rotational direction that is opposed to the first rotational direction. Further, when the opening force applied the vent exceeds a predetermined value such that the second torque is greater than the first torque, the body of the shoe assembly rotates in the second rotational direction from an unlocked position to a locked position and the shoe assembly is prevented from moving along the track in the first direction.

In still other aspects of the motion-activated stop, in the locked position the second end of the body engages a step of the plurality of steps.

Also, each step of the plurality of steps comprises an angled surface and a latching surface, the body of the shoe assembly comprises a surface at the second end of the body, and in the locked position, the bottom surface of the body engages the latching surface of the step of the plurality of steps.

In still other aspects of the motion-activated stop, each step of the plurality of steps comprises a first surface, an angled surface extending from the first surface and a latching surface extending from the angled surface. The body of the shoe includes a projection extending from the second end of the body. In the locked position, the projection engages the latching surface of the step of the plurality of steps.

Still further, the first surface and the angled surface form an included angle φ, wherein $90° < \varphi < 180°$. Also, the angled surface and the latching surface form an included angle θ, wherein $\theta < 90°$. Further, the first surface extends generally parallel to the longitudinal direction.

Still further, the projection is formed by a surface extending from the second end of the body and a surface extending from the second side of the body. Also, the surface extending from the second end of the body forms an included angle (α) with the second end of the body. Further, the included angle (α) is obtuse.

In other aspects, the surface extending from the second side of the body forms an included angle (β) with the second side of the body, the included angle (β) can be obtuse and/or the included angle (β) can be less than 180 degrees. Further, the included angle (β) can be between about 150 and 175 degrees.

In still other aspects, of the motion-activated stop the projection can be generally triangular shaped. In the locked position, the surface of the projection extending from the second end of the body engages the latching surface of the step of the plurality of steps.

In another aspect, the plurality of steps comprise a plurality of peaks and a plurality of valleys and the body of the shoe comprises a projection extending from the second end of the body and, in the locked position, the projection engages at least one of a peak and a valley.

In another aspect, the body of the shoe assembly comprises a first side and a second side, the biasing member applies the first force to first side of the body and, in the unlocked position, the second side of the body maintains contact with the first side wall of the recess over a plurality of steps.

The biasing member can include one of a linear wave spring and a compression spring.

In still further aspects of the motion-activated stop, the biasing member includes a compression spring, a guide rod and an end cap. The compression spring is arranged over the guide rod and a distal end of the compression spring is covered by the end cap. A proximal end of the compression spring is received in an aperture in the first side of the body.

Further, the second side wall of the track can be tapered at an angle (Δ) between a first end of the track and a second end of the track. The angle (Δ) can be less than about 5 degrees. Further, the angle (Δ) can be about 1.5 degrees.

Alternatively or in addition, the second side wall has a first thickness T1 at the first end and a second thickness T2 at the second end and the second side wall can be angled relative to a longitudinal axis of the track.

Still further, the track can include an aperture extending through the recessed portion and the body can include an aperture extending through the body. The retaining pin can be received in the aperture through the track member and the aperture through body and slidably couple the shoe assembly to the track.

In yet another aspect of the motion-activated stop of the disclosure, the body of the shoe assembly further has a first face and a second face, the first being opposite to the second face, an aperture formed through the body and extending from the first face to the second face. The retaining pin is received in the aperture. Still further, the body has a recessed portion formed in the first face of the body, the recessed portion concentric with the aperture and a plurality of cutouts formed on the first side of the body. The biasing member comprises a linear wave spring that is retained to the body by the plurality of cutouts.

Also, the plurality of cutouts comprises a first cutout and a second cutout and the linear wave spring comprises a first end and a second end, wherein the first end is retained in the first cutout and the second end is retained in the second cutout.

In a still further aspect of the disclosure, a vent window assembly comprising the motion-activated stop of the disclosure is provided.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
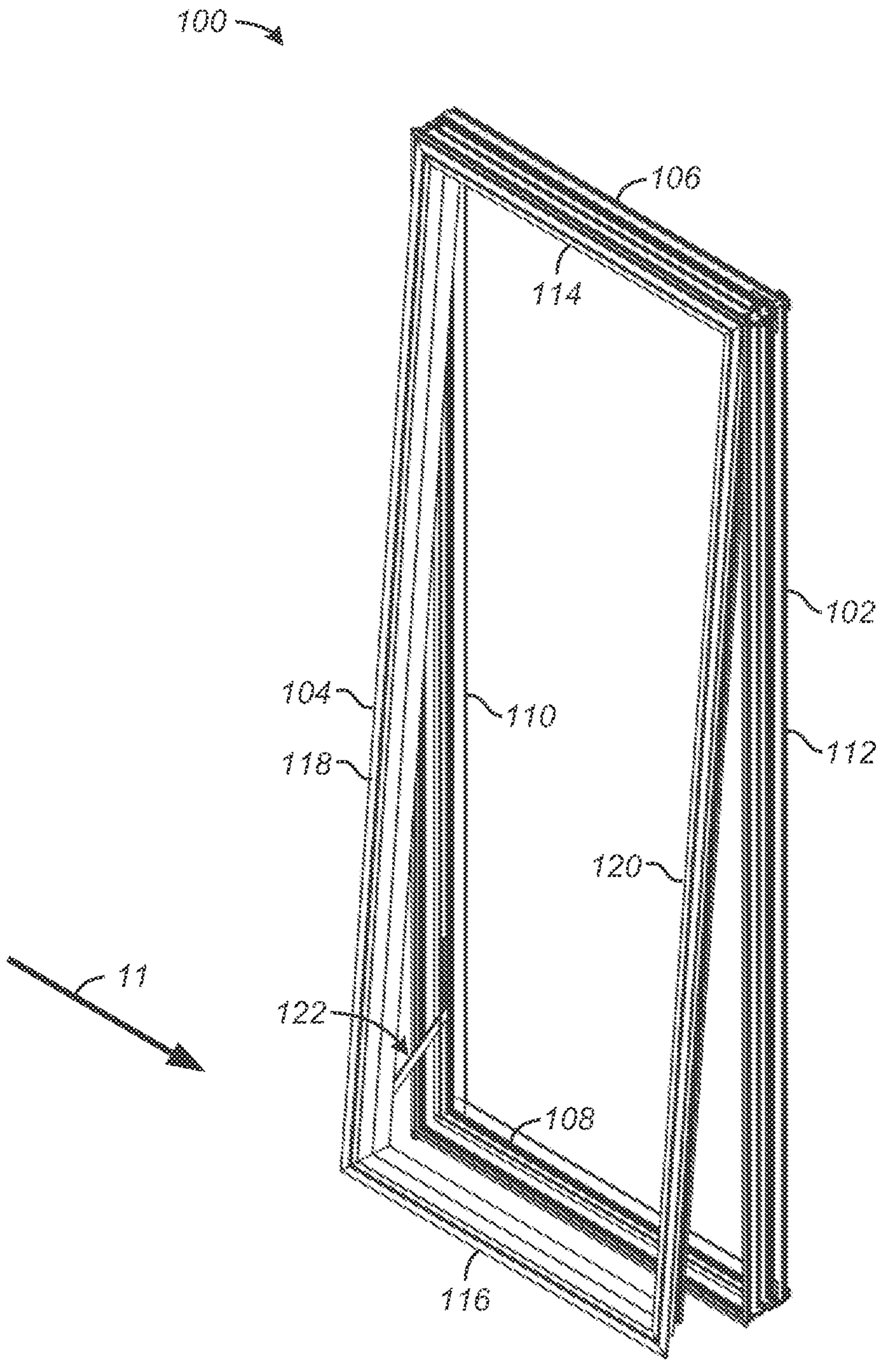
FIG. 1 is an isometric view of a window assembly in an opened or expanded position and including a vent retention apparatus or system comprising a hardware assembly in accordance with this specification.

FIG. 1 is an isometric view of a window assembly 100 in an opened or expanded position and including a vent retention apparatus comprising a hardware assembly 122 in accordance with this specification. As illustrated in FIG. 1, the window assembly 100 may be an awning-type window assembly having a window frame 102 and a window sash or vent 104. The frame 102 may typically take the shape of a polygon. In some instances, the polygon may be a rectangle having a top, bottom and two vertical sides. The frame 102 may include a top portion or head jamb 106 opposite a bottom portion or sill 108, and a first side portion or side jamb 110 opposite a second side portion or side jamb 112. The window vent 104 may include a top portion or top rail 114 opposite a bottom portion or bottom rail 116, and a first side portion or stile 118 opposite a second side portion or stile 120. In various implementations, the frame 102 may be coupled to the vent 104, such as by a one or more hinge assemblies which may be, for example, a multi-bar linkage or window stay (not shown) as is well-known in the art. For example, the vent 104 may be pivotally attached to the frame 102 by two hinge assemblies, one hinge assembly affixed between each stile 118, 120 of the vent 104 and a corresponding side jamb 110, 112 of the window frame 102 as is well-known in the art. In operation, this arrangement allows the vent 104 to pivot between a CLOSED position and an OPENED position such that the vent 104 moves out and away from the frame 102 generally at an acute angle relative to a plane defined by the window frame 102. For example, the bottom rail 116 of the vent 104 to moves out and away from the sill 108 of the frame 102, while the top rail 114 of the vent 104 moves down from, but remains nearer to, the head jamb 106 of the frame 102.

As illustrated in FIG. 1, the window assembly 100 may also include a vent retention system according to the teachings of the present disclosure, such as a window hardware assembly 122. The window hardware assembly 122 may be attached to the frame 102 and the vent 104. For example, the window hardware assembly 122 may attach the vent 104 to the frame 102. In various implementations, the window hardware assembly 122 may attach to the first side jamb 110 of the frame 102 and to the stile 118 of the vent 104. In various implementations, the window hardware assembly 122 may attach near a lower end of the first side jamb 110 and near a lower end of the stile 118.

In operation, some examples of the window hardware assembly 122 may engage to inhibit or prevent the vent 104 from opening and/or moving from a CLOSED or partially closed position toward an OPENED position, or continuing such movement, under certain predetermined conditions. For example, if the vent 104 is caused to move toward the OPENED position at an acceleration greater than or equal to an acceleration threshold value, or if the vent 104 is otherwise subjected to a force tending to urge the vent 104 toward the OPENED position that is greater than a force threshold value. In the absence of the occurrence of such predetermined conditions, however, the window hardware assembly 122 may allow the vent 104 to freely move or continue to move away from the frame 102 toward the OPENED position.

Figure 2:
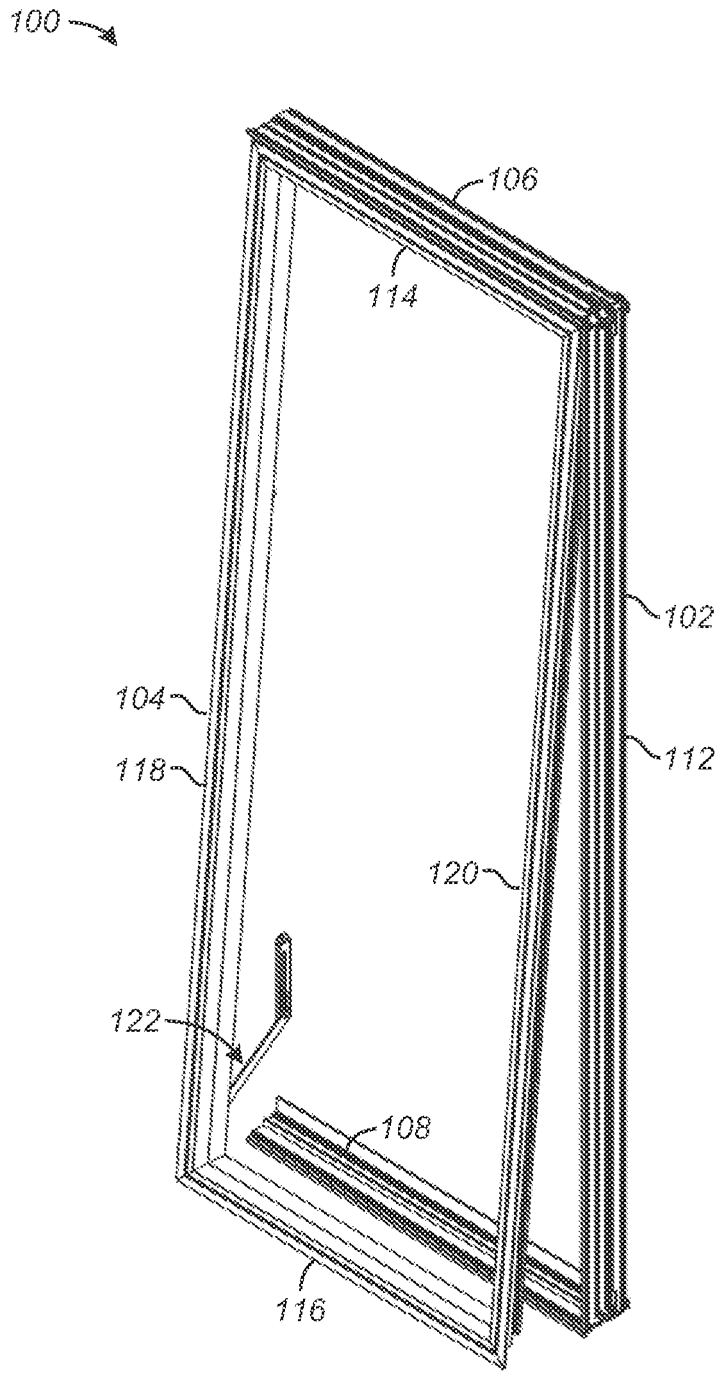
FIG. 2 is an isometric view of the window assembly of FIG. 1 in the opened or expanded position with the first side portion of the frame removed for clarity.

FIG. 2 is an isometric view of the window assembly of FIG. 1 in the OPENED or venting position with the first side jamb 110 (not shown) of the frame 102 removed for clarity. The window hardware assembly 122 may be more clearly seen with the first side jamb 110 of the frame 102 removed.

Figure 3:
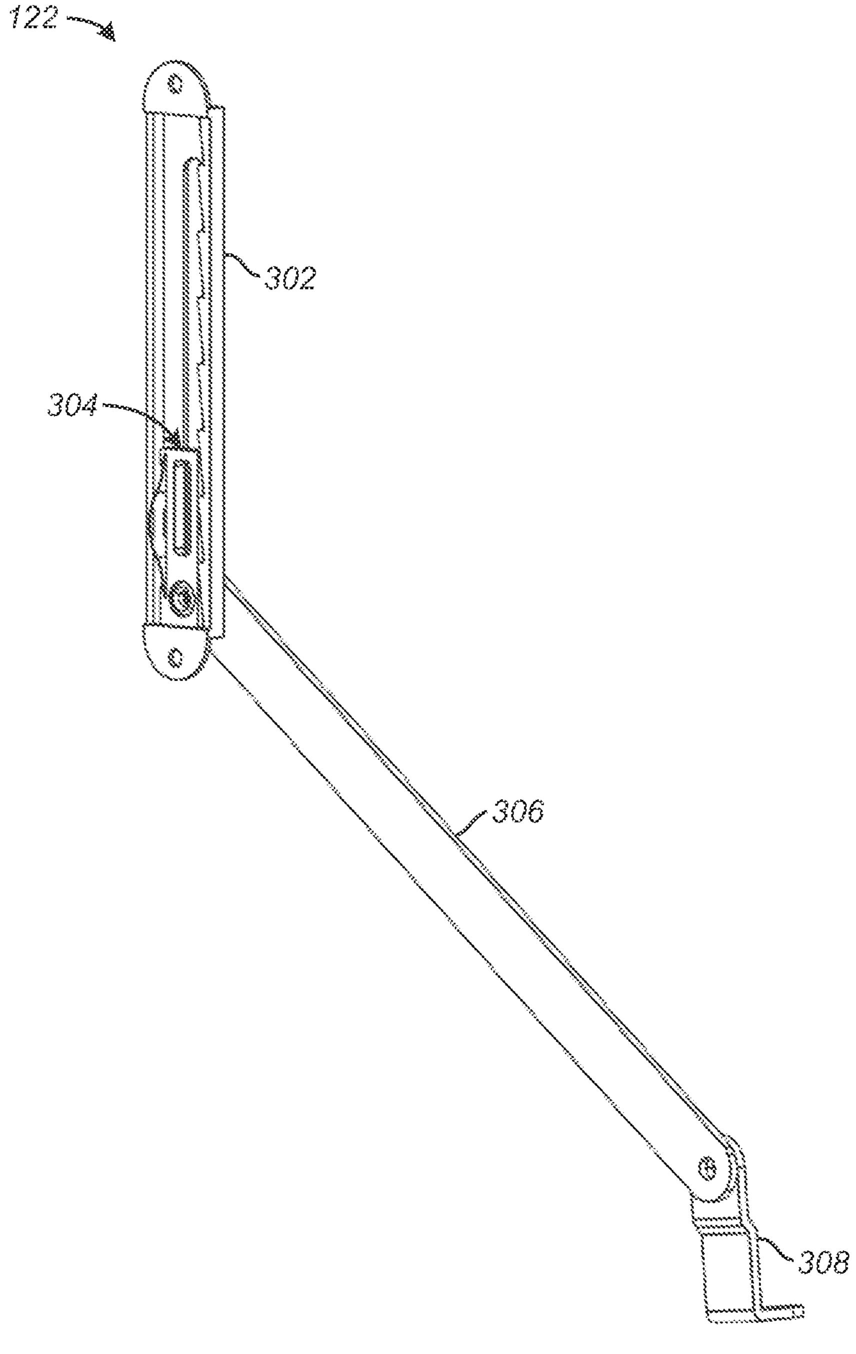
FIG. 3 is an isometric view of the interior or window frame-facing back side of the vent retention apparatus of FIGS. 1 and 2.

FIG. 3 is an isometric view of the interior or back side (i.e., the window frame-facing side) of the vent retention apparatus or window hardware assembly 122 of FIGS. 1 and 2. In various implementations, the window hardware assembly 122 includes a track member 302, a shoe assembly 304, a linkage member or link 306, and an attachment member or bracket 308. As will be explained in detail later, in some examples, track member 302 may be coupled or attached to the frame 102, such as at the first side jamb 110. In various implementations, the attachment member 308 may be coupled or attached to the vent 104, such as at the bottom rail 116. In various implementations, the track member 302 may be coupled to the shoe assembly 304, the shoe assembly 304 may be coupled to the linkage member 306, and the linkage member 306 may be coupled to the attachment member 308.

Figure 4:
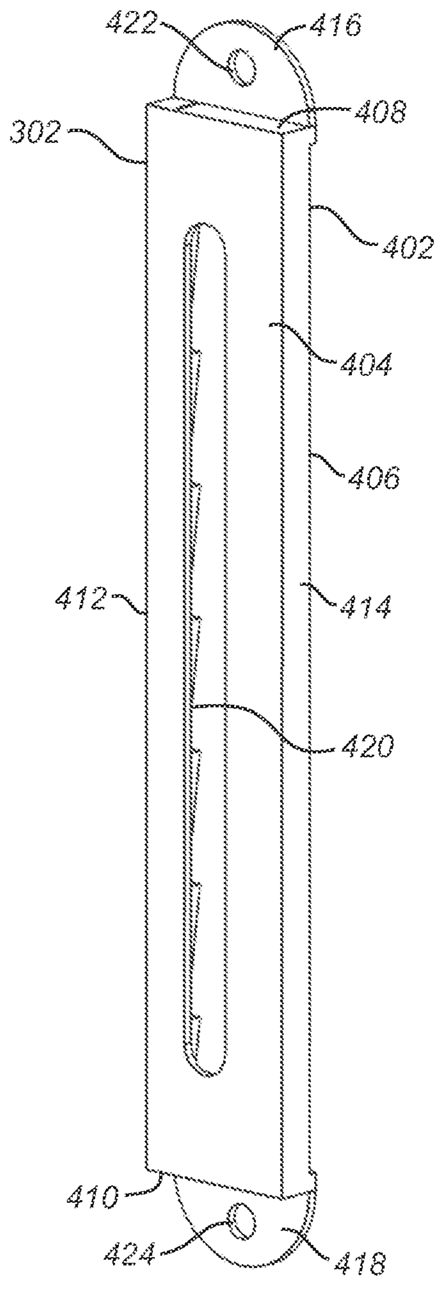
FIG. 4 is an isometric view of the exterior or front side of a track member of the vent retention apparatus of FIG. 3.

FIG. 4 is an isometric view of the exterior or front side (i.e., the window vent-facing side) of a track member 302 of the vent retention apparatus or window hardware assembly 122 of FIG. 3. The track member 302 may include a body 402 having a first face 404 opposite a second face 406, a first end 408 opposite a second end 410, and a first side 412 opposite a second side 414. In various implementations, the body 402 may have a shape substantially similar to a rectangular prism. For example, in various implementations the first face 404, second face 406, first end 408, second end 410, first side 412, and second side 414 may define surfaces forming a shape substantially similar to a rectangular prism. In various implementations, the first face 404 may define a rectangle with a relatively longer length between the first end 408 and the second end 410, and a relatively shorter width between the first side 412 and the second side 414. In various implementations, the first face 404, first end 408, second end 410, first side 412, and second side 414 may define substantially planar surfaces.

As illustrated in FIG. 4, the track member 302 may include a first mounting tab 416 and a second mounting tab 418. In various implementations, the first mounting tab 416 may be attached to the body 402 proximate the first end 408. In various implementations, the first mounting tab 416 may be integrally formed with the body 402 at the first end 408. In various implementations, the second mounting tab 418 may be attached to the body 402 proximate the second end 410. In various implementations, the second mounting tab 418 may be integrally formed with the body 402 at the second end 410. In various implementations, the first mounting tab 416 and the second mounting tab 418 may be defined by a first substantially planar surface opposite a second substantially planar surface, and a thickness between the first substantially planar surface and the second substantially planar surface. In various implementations, the first substantially planar surfaces and the second substantially planar surfaces of the first mounting tab 416 and the second mounting tab 418 may be substantially parallel to the surface of the first face 404 of the body 402. In various implementations, the first substantially planar surfaces and the second substantially planar surfaces of the first mounting tab 416 and the second mounting tab 418 may define semi-circular profiles in a plane parallel to the plane of the surface of the first face 404 of the body 402.

As illustrated in FIG. 4, an aperture 420 may extend through the body 402. Aperture 420 may extend from the first face 404 of the body 402 to the second face 406 of the body 402. For example, in various implementations, the aperture 420 may be a long, narrow opening, and take the form of a guide slot having a first end 420*a* and a second end 420*b*. In various implementations, the aperture 420 may have a profile in the plane parallel to the surface of the first face 404 defined by a rectangle with semi-circles at opposite ends, such as a stadium shape.

Figure 5:
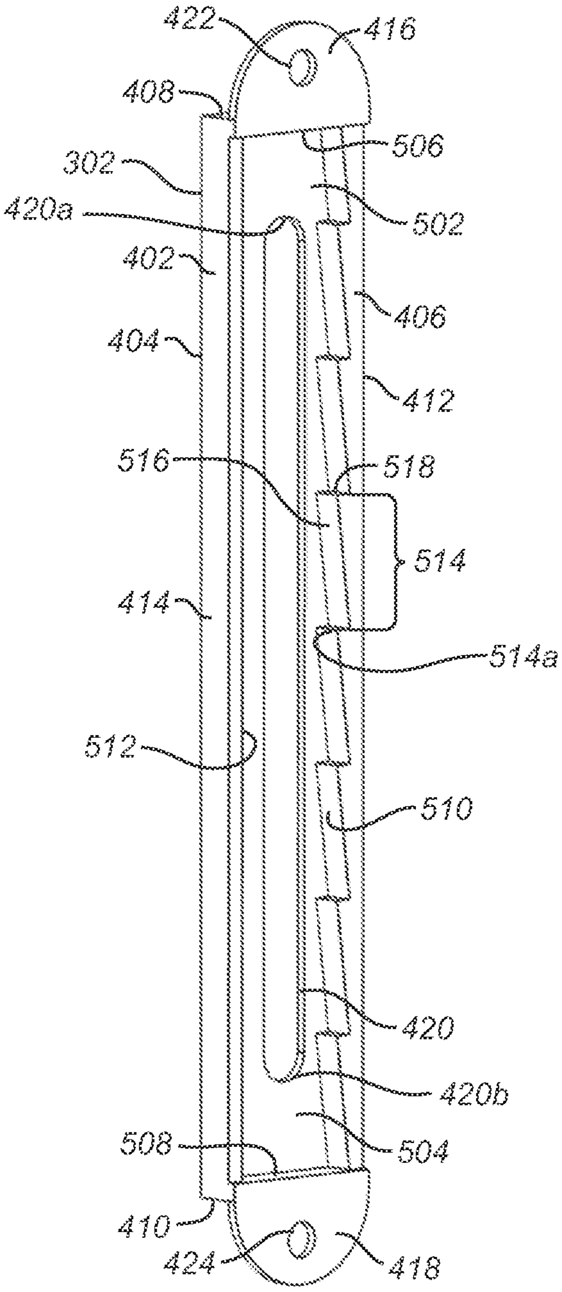
FIG. 5 is an isometric view of the interior side of the track member of FIG. 4.

FIG. 5 is an isometric view of the interior or back side (i.e., the window frame-facing side) of the track member 302 of FIG. 4. As shown in FIG. 5, the body 402 may have a cavity, such as recessed portion 502 formed on the second face 406. In various implementations, the recessed portion 502 may be formed by a substantially planar surface 504 in a plane substantially parallel to the plane of the second face 406. The substantially planar surface 504 may be bounded by a first end wall 506 near the first end 408 of the body 402 opposite a second end wall 508 near the second end 410 of the body 402, and a first side wall 510 near the first side 412 of the body 402 opposite a second side wall 512 near the second side 414 of the body 402. In various implementations, a surface of the first end wall 506 may be substantially orthogonal to the substantially planar surface 504. In various implementations, a surface of the second end wall 508 may be substantially orthogonal to the substantially planar surface 504. In various implementations, surfaces of the first side wall 510 may be substantially orthogonal to the substantially planar surface 504. In various implementations, a surface of the second side wall 512 may be substantially orthogonal to the substantially planar surface 504.

As illustrated in FIG. 5, in various implementations, a plurality of steps 514 may be formed on first side wall 510 of the recessed portion 502. In various implementations, each step 514 may be formed by an angled surface 516 and a latching surface 518. In various implementations, each angled surface 516 may slant in the direction of second end 410 of the body 402 at a downward angle (i.e., forming an acute angle with a longitudinal axis Y of the track member 302). In various implementations, each angled surface 516 may be angled to face the second end wall 508 and the second side wall 512. In various implementations, each latching surface 518 may face the first end wall 506 of the body 402. In various implementations, each latching surface 518 may be substantially parallel to the surface of the first end wall 506 (i.e., extending generally in the direction of an axis X of the track member transverse to the longitudinal axis Y). In various implementations, each step 514 may have a profile in a plane parallel to the first face 404, second face 406, and/or substantially planar surface 504 defined by a right triangle. For example, the angled surface 516 may define a hypotenuse of the right triangle, and the latching surface 518 may define a leg of the right triangle.

Figure 6:
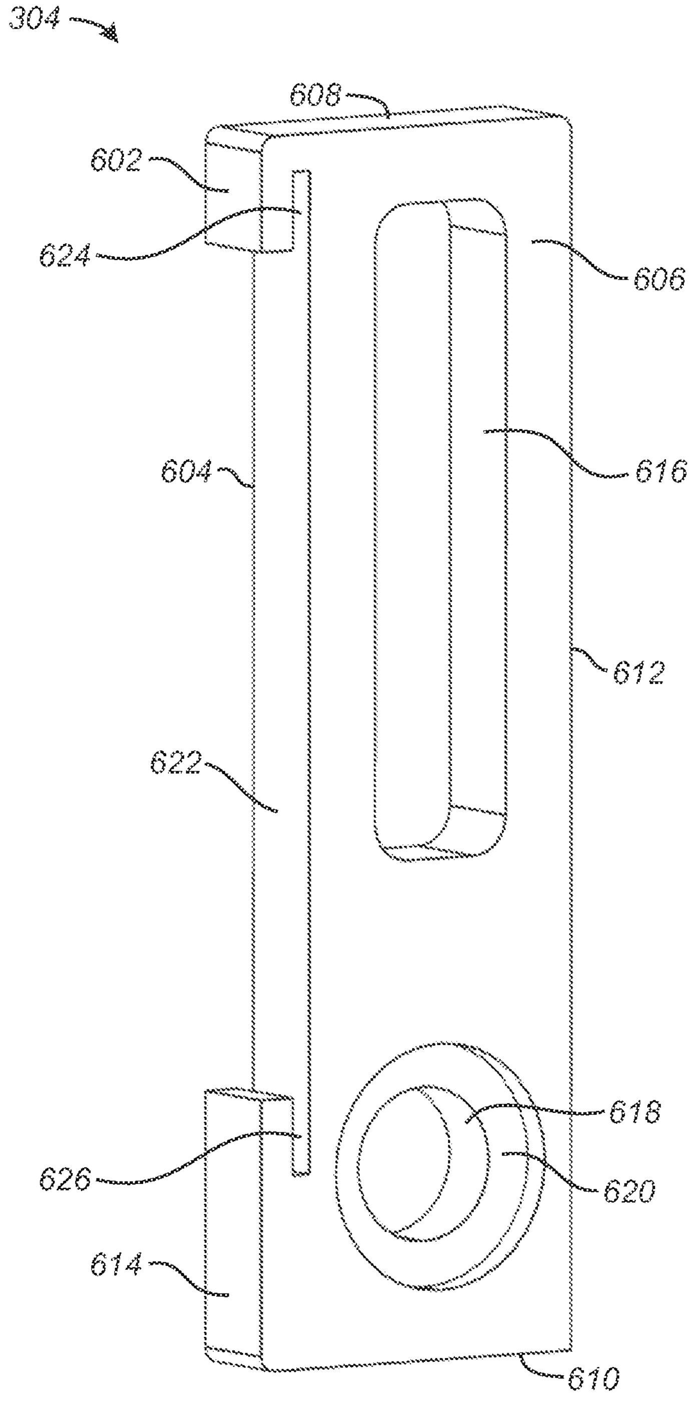
FIG. 6 is an isometric view of the back side of a shoe assembly of the vent retention apparatus of FIG. 3.

FIG. 6 is an isometric view of the back side of a shoe assembly 304 of the vent retention apparatus or window hardware assembly 122 of FIG. 3. The shoe assembly 304 may include a body 602 having a first face 604 opposite a second face 606, a first end 608 opposite a second end 610, and a first side 612 opposite a second side 614. In various implementations, the body 602 may have a relatively longer length between the first end 608 and the second end 610, and a relatively shorter width between the first side 612 and the second side 614. In various implementations, a first opening, such as aperture 616, may be formed through the body 602. For example, aperture 616 may extend from the first face 604 to second face 606. A second opening, such as aperture 618, may be formed through the body 602. For example, aperture 618 may extend from the first face 604 to the second face 606. In various implementations, aperture 618 may have a profile in the shape of an ellipse or circle in a plane parallel to the plane of the first face 604 and/or the second face 606. A recessed portion or cavity, such as recessed portion 620, may be formed in the second face 60. In various implementations, the recessed portion 620 may have a profile in the shape of an ellipse or circle in the plane parallel to the plane of the first face 604 and/or the second face 606. In various implementations, the profile of the aperture 618 may be concentric with the profile of the recessed portion 620 in the plane parallel to the plane of the first face 604 and/or the second face 606.

As shown in FIG. 6, in various implementations, one or more portions of the body 602 may be removed at the second side 614 to define one or more cutouts, such as cutout 622. In various implementations, cutout 622 may have a profile in the shape of a rectangle in the plane parallel to the plane of the first surface 604 and/or the second surface 606. In various implementations, additional portions of the body 602 may be removed near the second side 614. For example, a portion of the body 602 may be removed proximate the portion of cutout 622 near the first end 608 to define a notch 624, and a portion of the body 602 may be removed proximate the portion of cutout 622 near the second end 610 to define a notch 626. In various implementations, notch 624 and notch 626 may have profiles in the shape of rectangles in the plane parallel to the plane of the first surface 604 and/or the second surface 606.

Figure 7:
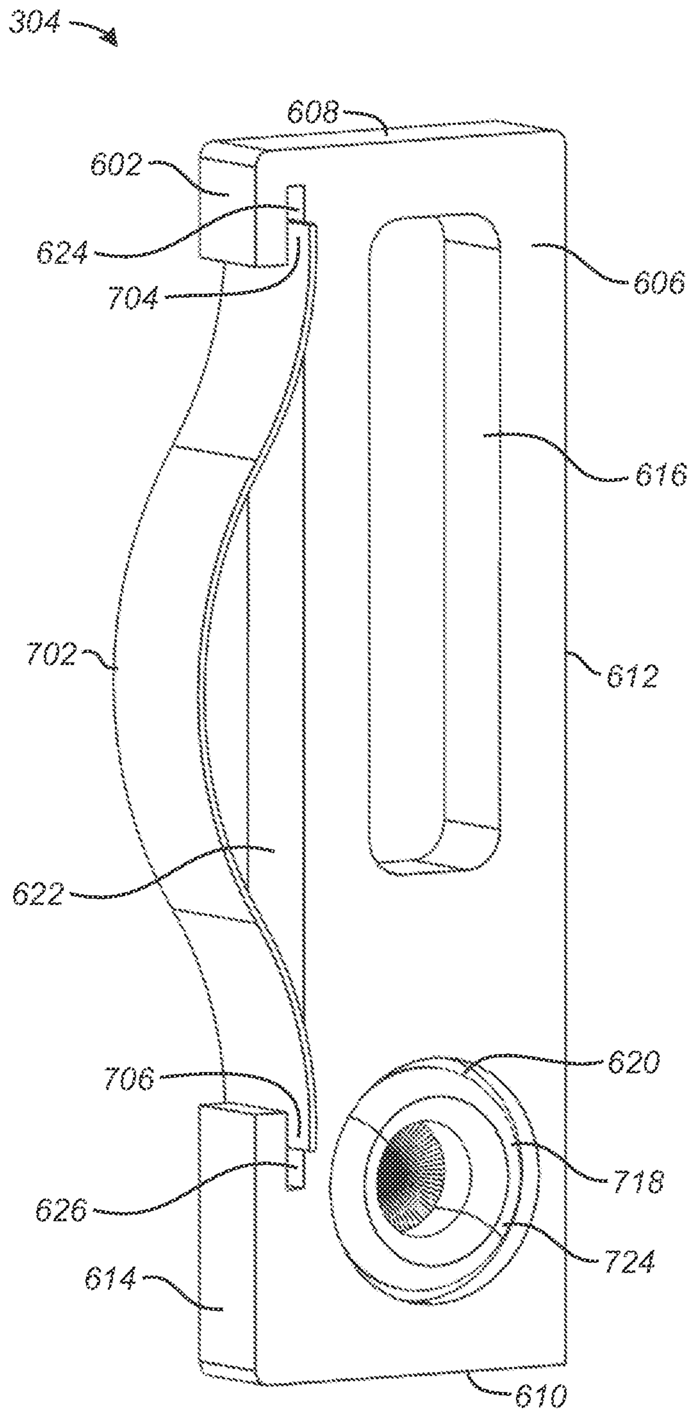
FIG. 7 is an isometric view of the back side and illustrating additional details that may be associated with some examples of the shoe assembly of FIG. 6 for the vent retention apparatus of FIG. 3.
Figure 7A:
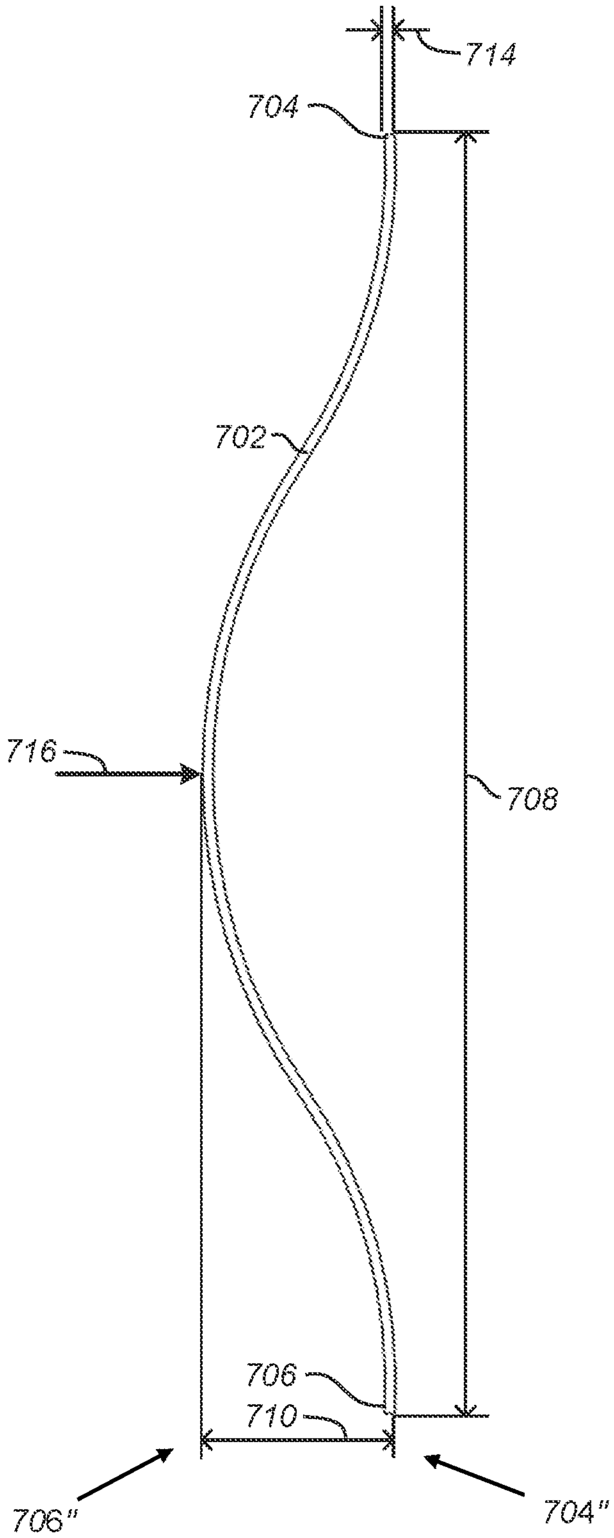
FIG. 7A is a side view of a spring member of the shoe assembly of FIG. 7 in a resting state.

FIG. 7 is an isometric view of the back side and illustrating additional details that may be associated with some examples of the shoe assembly 304 of FIG. 6 for the vent retention apparatus or window hardware assembly 122 FIG. 3. As illustrated in FIG. 7, the shoe assembly 304 may further include a biasing member, such as biasing member 702. In various implementations, biasing member 702 may include a linear wave spring. FIG. 7A is a side view of a biasing member 702 of the shoe assembly 304 of FIG. 7 in a resting state. As illustrated in FIG. 7A, the biasing member 702 may have a first end 704 opposite a second end 706. In various implementations, in the resting state, the biasing member 702 may have a length 708 of about 1.5 inches as measured between the first end 704 and the second end 706. In various implementations, in the resting state, the biasing member 702 may have a height 710 measured between a proximal end 704" and a distal end 706" of about 0.225 inches. Referring to FIG. 7, in various implementations, the biasing member 702 may have a width 712 of about 0.25 inches. Referring back to FIG. 7A, in various implementations, the biasing member 702 may be formed of a high-carbon steel having a thickness 714 of about 0.012 inches. In various implementations, when a working load 716 is applied to the biasing member 702, the biasing member 702 may compress such that the height 710 is reduced. For example, when a working load 716 of about 2.2 pounds is applied to the biasing member 702, the biasing member 702 may be deflected such that the height 710 of the biasing member 702 is reduced by about 0.1 inches, from about 0.225 inches to about 0.125 inches.

Referring back to FIG. 7, in various implementations, the first end 704 of the biasing member 702 may be received in notch 624 of the body 602, and the second end 706 of the biasing member 702 may be received in notch 626 of the body 602. In various implementations, the first end 704 may be fixed to notch 624, and the second end 706 may be fixed to notch 626 such that the biasing member 702 is stretched and no longer in the resting state. For example, when the first end 704 is fixed to notch 624 and the second end 706 is fixed to notch 626, the length 708 of the biasing member 702 may be stretched to about 0.2 inches.

Figure 7B:
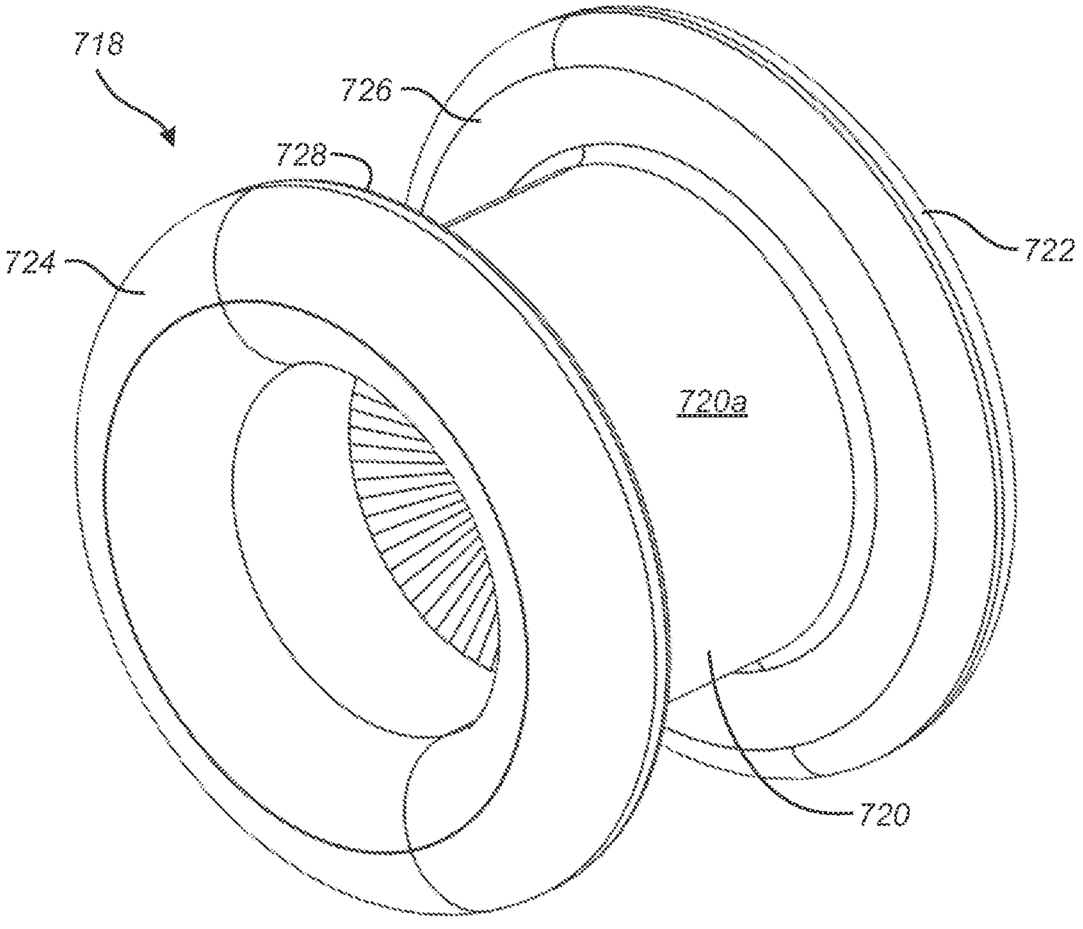
FIG. 7B is an isometric view illustrating additional details associated with a retaining pin of the shoe assembly of FIG. 7.

In various implementations, the shoe assembly 304 may also include a retaining member, such as retaining pin 718. FIG. 7B is an isometric view illustrating additional details associated with a retaining pin 718 of the shoe assembly 304 of FIG. 7. As illustrated in FIG. 7B, the retaining pin 718 may include a columnar center portion 720 with a first retaining cap 722 at a first end of the center or barrel portion 720 having a cylindrical outer bearing surface 720*a*, and a second retaining cap 724 at a second end of the center portion 720 opposite the first end. In various implementations, the first retaining cap 722 and the second retaining cap 724 may each have a width or a diameter greater than a width or a diameter of the center portion 720. In various implementations, the first retaining cap 722 may have a first retaining surface 726 facing the center portion 720 and the second retaining cap 724 may have a second retaining surface 728 facing the center portion 720 and the first retaining surface 726. Further, as is well-understood, the retaining pin 718 may comprise two pieces in the form of a barrel and screw construction. That is, the second retaining cap 724 may be integral with the center portion 720. The center portion 720 may take the form of a tube and include a hollow, female-threaded interior. The first retaining cap 722 may comprise a male-threaded shaft extending from the first retaining surface 726. The male-threaded shaft of the first retaining cap 722 may then be received in the female-threaded interior of the second retaining cap 724 so that the first and second retaining caps 722, 724 are secured together.

As illustrated in FIG. 7, in various implementations, the center portion 720 of retaining pin 718 may be received in aperture 614 of body 602. In various implementations, the retaining pin 718 may be disposed such that the retaining surface 728 of the second retaining cap 724 is in contact with the surface of the recessed portion 620.

Figure 8:
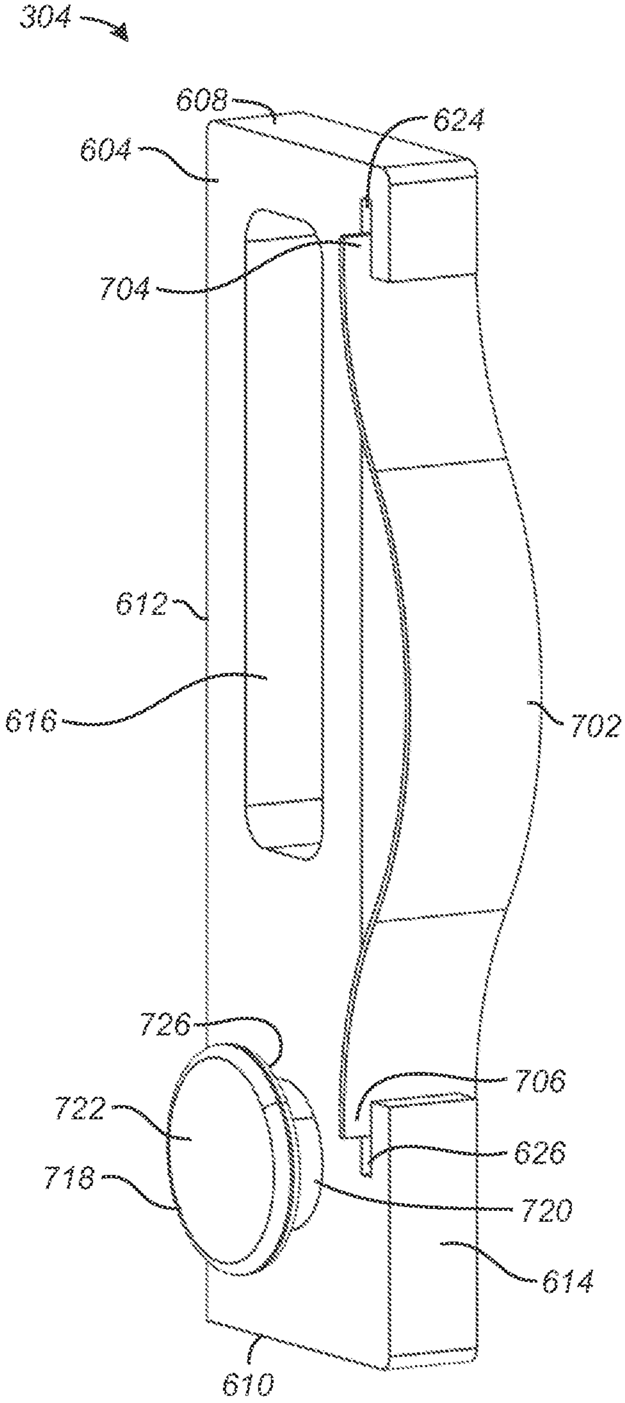
FIG. 8 is an isometric view illustrating additional details that may be associated with some examples of the shoe assembly of FIG. 7.

FIG. 8 is an isometric view illustrating additional details that may be associated with some examples of the shoe assembly 304 of FIG. 7. As shown in FIG. 8, in various implementations, when the retaining pin 718 is received in the aperture 618 of body 602 such that the retaining surface 728 of the second retaining cap 724 is in contact with the surface of the recessed portion 620, the first retaining cap 722 may be positioned a distance away from the first face 604 of body 602 such that the retaining surface 726 of the first retaining cap 722 is positioned a distance away from the first face 604.

Figure 9:
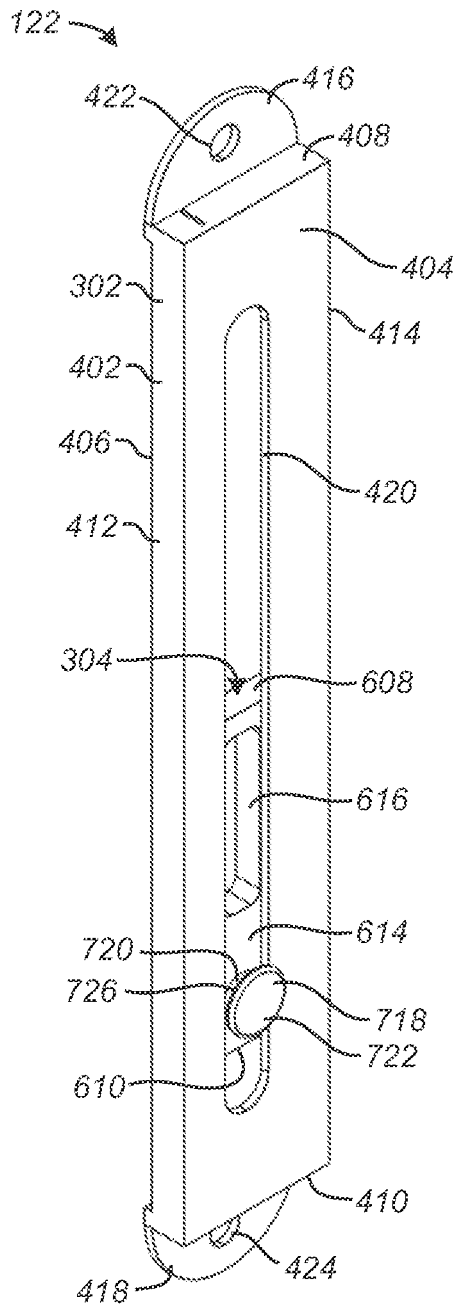
FIG. 9 is an isometric view of a portion of the vent retention apparatus according to the present disclosure.

FIG. 9 is an isometric view of a portion of the vent retention apparatus or window hardware assembly 122 according to the present disclosure. As illustrated in FIG. 9, the shoe assembly 304 may be coupled to the track member 302. In various implementations, the body 602 of the shoe assembly 304 may be positioned within the recessed portion 502 (not shown) of the body 402 such that the first face 604 of the body 602 of the shoe assembly 304 is proximate the substantially planar surface 504 (not shown) of the recessed portion 502. The retaining pin 718 may function to couple the shoe assembly 304 to the track member 302 such that the shoe assembly 304 is able to slide within the recessed portion 502 between the first end wall 506 (not shown) and the second wall 508 (not shown). For example, the center portion 720 of the retaining pin 718 may be received through the aperture or guide slot 420, and be sized such that the center portion 720 may be able to freely slide in the aperture or guide slot 420 between the first end 420*a* and the second end 420*b* of the aperture or guide slot 420. In various implementations, the retaining surface 726 of the first retaining cap 722 of the retaining pin 718 may be disposed proximate to the first face 404 of the body 402 of the track member 302. Thus, the body 402 of the track member 302 may be retained between the retaining surface 726 of the retaining pin 718 and the first face 604 of the body 602 of the shoe assembly 304, and further retained between the substantially planar surface 504 of the body 402 of the track member 302 and retaining surface 728 of the retaining pin 718.

Figure 10:
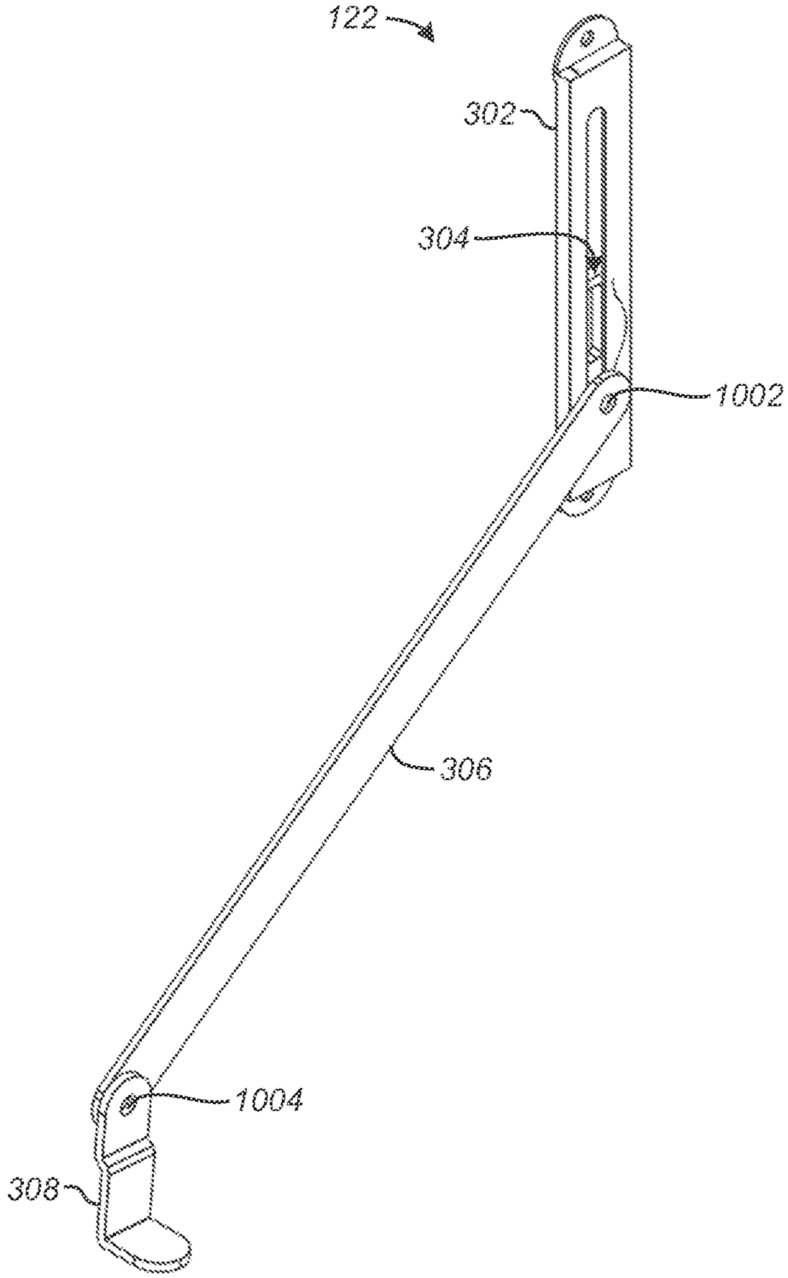
FIG. 10 is an isometric view of the exterior or front side and illustrating additional details associated with the vent retention apparatus of FIG. 3.

FIG. 10 is an isometric view of the exterior or front side and illustrating additional details associated with the vent retention apparatus or window hardware assembly 122 of FIG. 3. As illustrated in FIG. 10, the linkage member 306 may be pivotally coupled to the shoe assembly 304. In various implementations, a first end of the linkage member 306 may be pivotally coupled to the retaining pin 718 of the shoe assembly 304 at attachment point. For example, the linkage member 306 may be pivotally coupled to the retaining pin 718 by a pivot pin received through an aperture 1002 at the first end of the linkage member 306 and an aperture formed through the retaining pin 718. Similarly, the linkage member 306 may be pivotally attached to the attachment member 308. In various implementations, a second end of the linkage member 306 may be pivotally coupled to the attachment member at attachment point 1004. For example, the linkage member 306 may be pivotally coupled to the attachment member 308 by a pivot pin received through an aperture at the second end of the linkage member 306 and an aperture formed through the attachment member 308.

Figure 11:
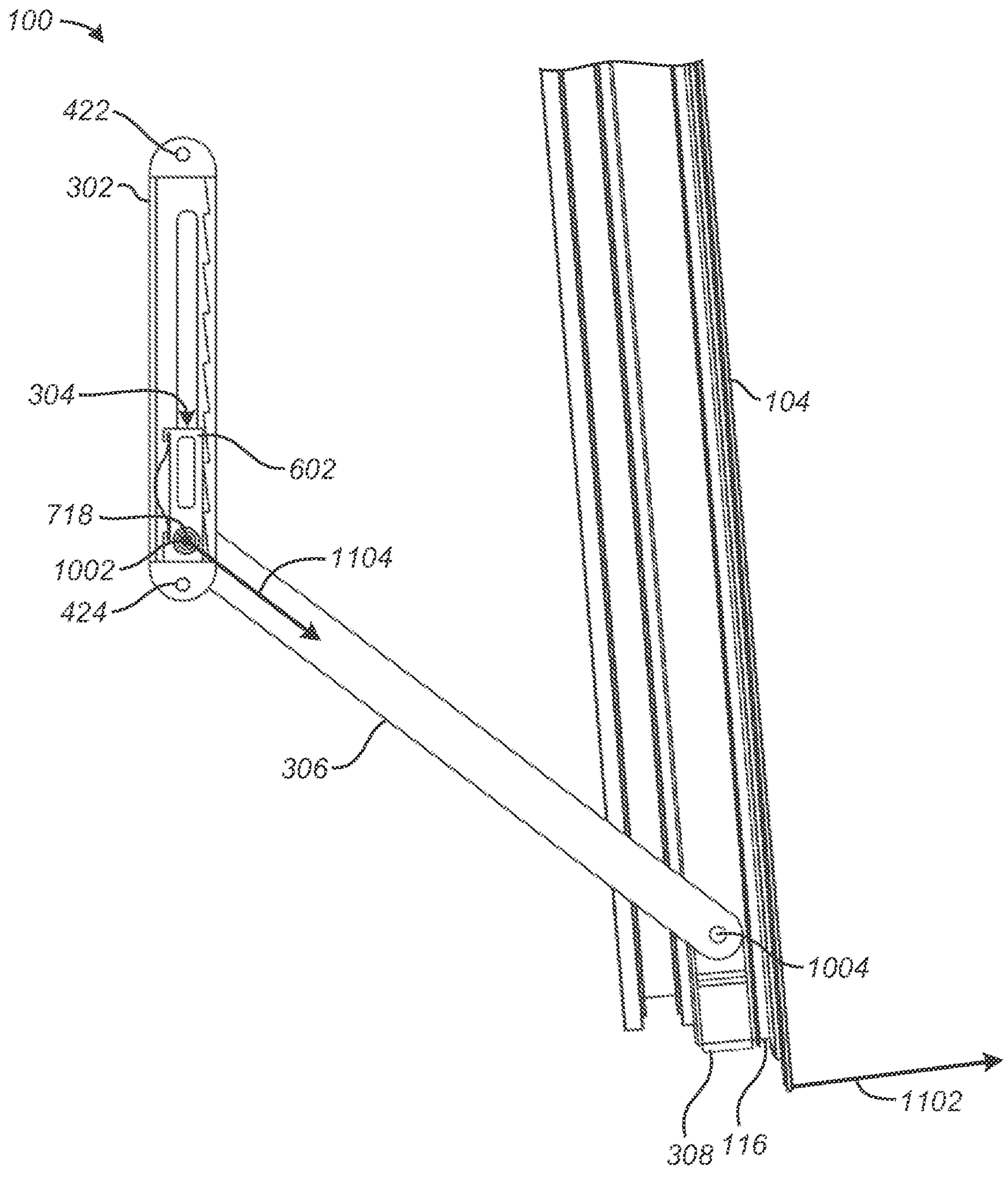
FIG. 11 is a side view of window assembly of FIGS. 1 and 2 with a portion of the window frame removed, as viewed in the direction of arrow 11 of FIG. 1.

FIG. 11 is a side view of window assembly 100 of FIGS. 1 and 2 with a portion of the window frame 102 removed, as viewed in the direction of arrow 11 of FIG. 1. In various implementations, the track member 302 may be coupled to the window frame 102 (not shown). For example, the track member 302 may be attached to the window frame 102 through nails, screws, or rivets received through aperture 422 and/or aperture 424 of track member 302. In various implementations, the attachment member 308 may be coupled to the vent 104. For example, the attachment member 308 may be attached to the vent 104 at the stile 118 or the bottom rail 116 of the vent 104. Any forces experienced by the vent 104, such as force vector 1102 at the bottom portion 112 of the vent 104, may be transmitted from the vent 104 to the attachment member 308, from the attachment member 308 to the linkage member 306 through attachment point 1004, from the linkage member 306 to the retaining pin 718 through attachment point 1002, from the retaining pin 718 to the shoe assembly 304, from the shoe assembly 304 to the track member 302, and from the track member 302 to the window frame 102. The force experienced at attachment point 1002, retaining pin 718, or the aperture 614 of the body 602 of the shoe assembly 304 may be expressed by force vector 1104, and may be a function dependent on the force vector 1102.

Figure 12:
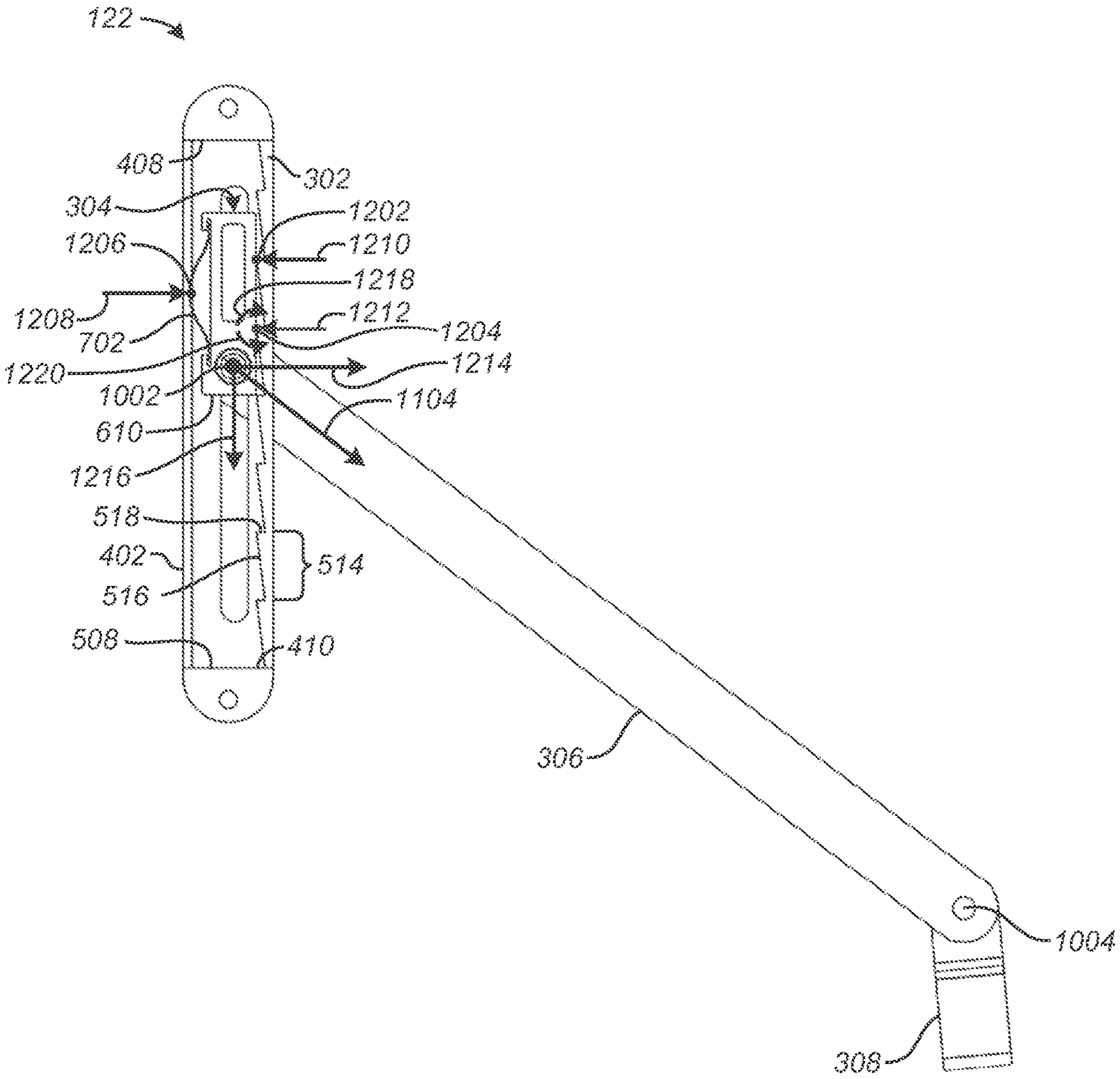
FIG. 12 is a side view of the interior or frame facing side of the vent retention apparatus according to the present disclosure in a first or unlocked position.
Figure 13:
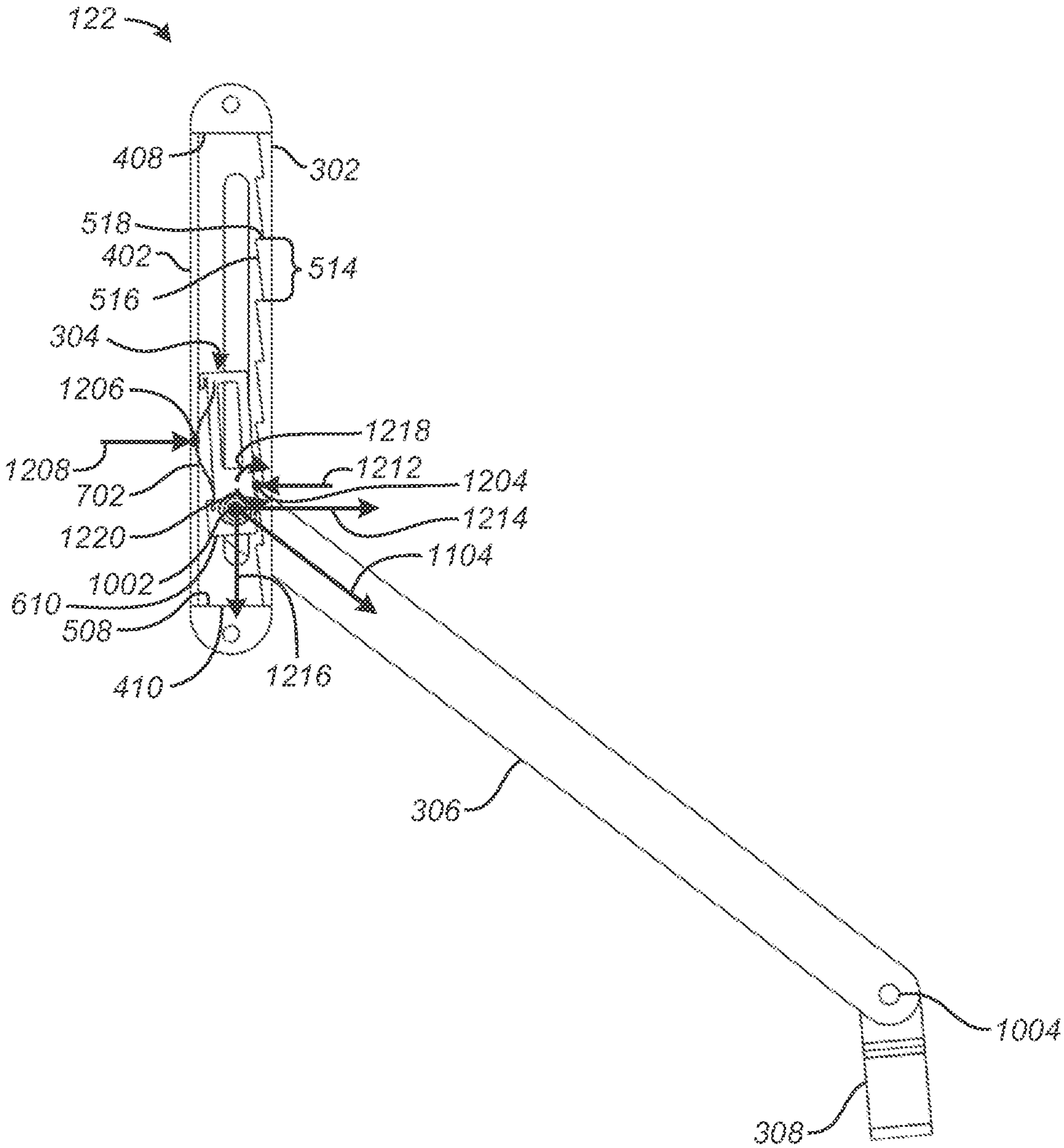
FIG. 13 is a side view of the interior or frame facing side of the vent retention apparatus according to the present disclosure in a second or transitional position.
Figure 14:
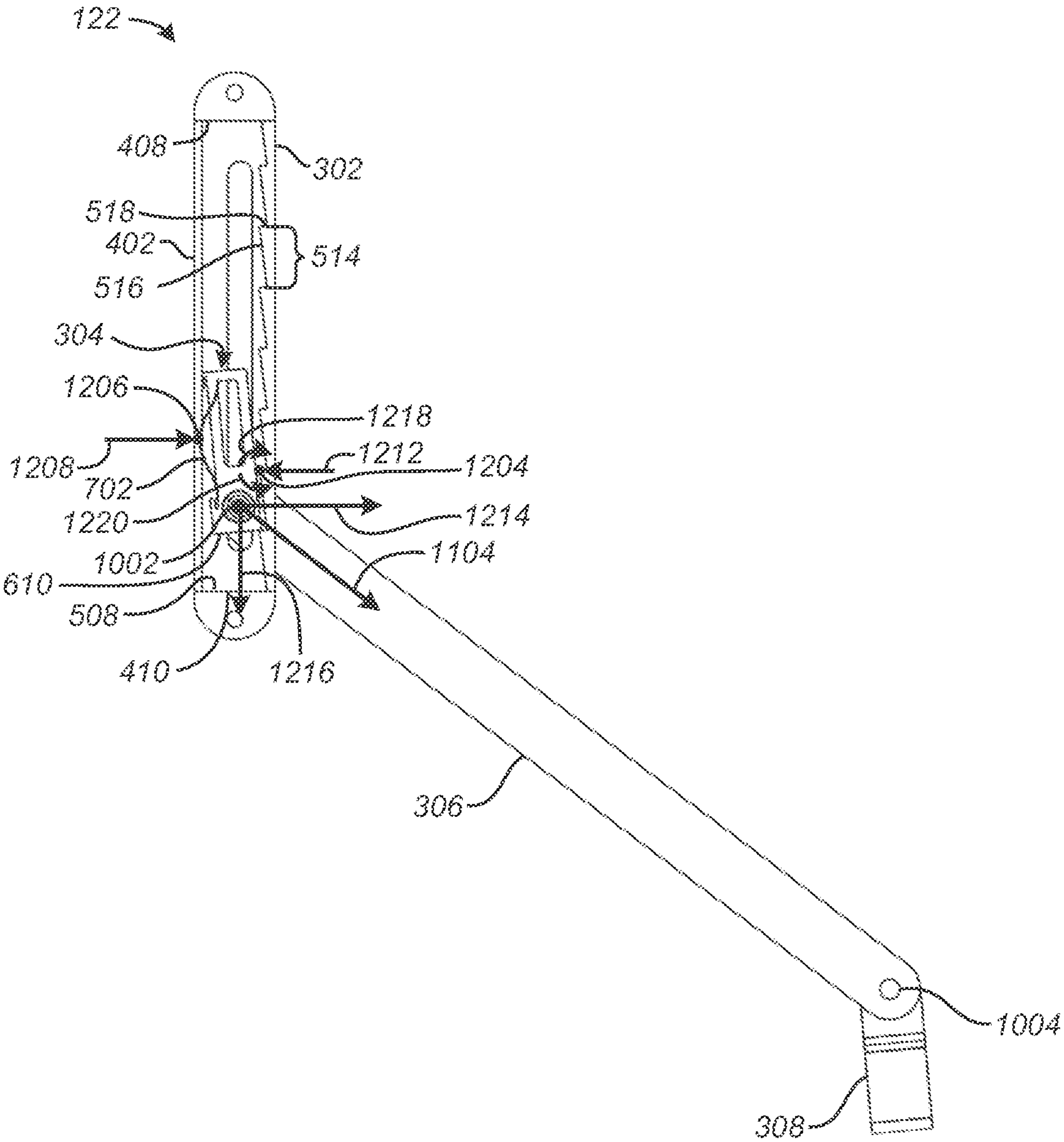
FIG. 14 is a side view of the interior or frame facing side of the vent retention apparatus according to the present disclosure in a third or locked position.

FIG. 12 is a side view of the interior or frame facing side of the vent retention apparatus or window hardware assembly 122 of the present disclosure in a first or unlocked position. FIG. 13 is a side view of the interior or frame facing side of the vent retention apparatus or window hardware assembly 122 according to the present disclosure in a second or transitional position. FIG. 14 is a side view of the interior or frame facing side of the vent retention apparatus or window hardware assembly 122 according to the present disclosure in a third or locked position. As illustrated in FIG. 12, the shoe assembly 304 may be in contact with the body 402 of the track member 302 at one or more contact points. For example, the first side 612 of the body 602 of the shoe assembly 304 may be in contact with the first side wall 510 of the recessed portion 502 of the track member 302 at contact points 1202 and 1204. Contact points 1202 and 1204 may be at a respective vertex formed at the intersection of the angled surface 516 and latching surface 518 of a respective step 514. Additional, in various implementations, the biasing member 702 of the shoe assembly 304 may be in contact with the second side wall 512 of the recessed portion 502 of the track member 302 at contact point 1206. Depending on the force vectors acting on the shoe assembly 304, one of contact points 1202 or 1204 may act as a fulcrum or pivot point for the body 602 of the shoe assembly 304.

In the scenario where force vector 1104 is zero, the force vectors acting on the shoe assembly 304 may be balanced. For example, the biasing member 702 may exert a spring force vector 1208 on the shoe assembly 304, and the track member 302 may exert an opposing normal force vector 1210 at contact point 1202, and an opposing normal force vector 1212 at contact point 1204. Thus, the sum of normal force vectors 1210 and 1212 may be equal in magnitude to the spring force vector 1208, the scalar magnitude $F_s$ of which may be expressed by equation (1) below:

$$F_s = k \cdot x, \tag{1}$$

where k represents the spring constant of the biasing member 702 and x represents the compression of the biasing member 702.

In other scenarios, force vector 1104 may not be zero. In such examples, the force vector 1104 may be decomposed into a first force vector component 1214 in a direction parallel to force vectors 1208, 1210, and 1212, and a second force vector component 1216 in a direction orthogonal to force vectors 1208, 1210, and 1212, and in a direction between the first end 408 and second end 410 of the body 402 of the track member 302. Each force vector may exert a rotational moment at a pivot point of the shoe assembly 304, which may be expressed as a torque τ. The torque τ exerted by each force vector or component may be expressed by equation (2) below:

$$\tau = F \cdot d, \tag{2}$$

where F represents the magnitude of the force vector or component and d represents the distance of the force vector or component from the pivot point. In some examples, the pivot point may be at contact point 1204.

In examples where the pivot point of the shoe assembly 304 is at contact point 1204, the spring force vector 1208 may act on the shoe assembly 304 to produce a first torque or rotational moment 1218 in a first rotational direction (shown as being clockwise (cw) in FIG. 12), while the first force vector component 1214 and the normal force vector 1210 may act to produce a second torque or rotational moment 1220 in a second rotational direction (shown as being counter-clockwise (ccw) in FIG. 12), where the second rotational direction is opposite the first rotational direction. At magnitudes below a first threshold, the first force vector component 1214 will not be sufficient to overcome the cw rotational moment 1218 generated by the spring force vector 1208. In such scenarios, the normal force vector 1210 will be of a sufficient magnitude such that the resultant rotational moment 1220 generated by the first force vector component 1214 and the normal force vector 1210 will be equal to the opposite rotational moment 1218 generated by the spring force vector 1208 at contact point 1204. However, when the magnitude of the first force vector component 1214 reaches and exceeds the first threshold, the first force vector component 1214 will generate enough of a rotational moment 1220 to overcome the rotational moment 1218 generated by the spring force vector 1208 at the compression distance x of biasing member 702, causing the biasing member 702 to compress further. In the process, the shoe assembly 304 will rotate in the ccw direction of rotational moment 1220, also causing normal force 1210 to approach a value of zero in the process. Thus, the spring constant k and the compression x of the biasing member 702 may be selected such that when force vector 1102 applied to vent 104 exceeds a second threshold, the first force vector component 1214 exceeds the first threshold, and the shoe assembly 304 will rotate in the ccw direction of rotational moment 1220.

In various implementations, it may be desirable to select the biasing member 702 such that the first force vector component 1214 may overcome the rotational moment 1218 generated by the spring force vector when a design pressure of DP-75 is applied to a vent 104 having a height between the top rail 114 and bottom rail 116 of about 110 inches, and a weight of about 400 pounds. For example, the biasing member 702 may be selected such that the vent 104 may be prevented from opening further within about 0.5 seconds in response to about a 150 pound per square foot (psf) being applied to the vent 104. For example, the vent 104 may be prevented from opening further when the magnitude of force vector 1104 exceeds about 0.299 pounds.

As illustrated in the example of FIG. 13, when the force vector 1102 exceeds the second threshold, causing the first force vector component 1214 to exceed the first threshold, the shoe assembly 304 rotates in the ccw direction of rotational moment 1220. Depending on the position of the shoe assembly 304 within the track member 302, the second force vector component 1216 may act on the shoe assembly 304, pulling the shoe assembly 304 in the direction of the second force vector component 1216 towards the second end 410 of the body 402 of the track member 302 until the second end 610 of the body 602 of the shoe assembly 304 contacts a latching surface 518 of a step 514, FIG. 14. When the second end 610 of the shoe assembly 304 contacts the latching surface 518, the latching surface 518 stops the motion of the shoe assembly 304 in the direction of the second force vector component 1216. In some examples, the second end 610 may contact the second end wall 508 of the recessed portion 502 of the track member 302, and the second end wall 508 may stop the motion of the shoe assembly 304 in the direction of the second force vector component 1216.

As can be understood from the foregoing description, the vent retention system comprising the window hardware assembly 122 may provide significant advantages. For example, when used with vent-style windows, the window hardware assembly 122 may inhibit window vents, such as vent 104, from opening under conditions where the vent 104 is subject to rapid acceleration or force that could cause damage to the window assembly. As such, the window hardware assembly 122 may offer a number of benefits to the builder during construction of structures such as commercial buildings, particularly if large and/or heavy awning-type windows are installed before the buildings are fully sealed against the outside environment. For example, during construction, strong winds and other environmental forces may enter the partially-constructed building through unsealed portions of the building and create a pressure differential across the vent 104. In certain scenarios, the pressure may be higher on the interior-facing side of the vent 104 than on the exterior-facing side of the vent 104, generating the previously described force vector 1102, which accelerates the mass of vent 104 toward the OPENED position. As the large awning-type windows are heavy, the large mass of the vent 104 may result in the vent 104 swinging toward the OPENED position with a large momentum, which could result in damage to the window assembly 100 or building.

However, the vent retention system comprising the window hardware assembly 122, may act as a countermeasure to environmental forces by inhibiting or arresting the motion of the vent 104 toward the OPENED position before the vent 104 can gain a sufficiently large momentum to cause damage to the window assembly 100 or associated structure of the building.

As described, force vector 1102 may cause the vent 104 to move from the CLOSED position toward the OPENED position under rapid acceleration. As previously discussed, when force vector 1102 is greater than or equal to the force threshold value, force vector 1102 may cause the vent 104 to accelerate toward the OPENED position at an acceleration greater than or equal to the acceleration threshold value. Under such a condition, the second rotation moment 1220 generated by the force vector 1102 exceeds the first rotational moment 1218 generated by the spring force vector 1208, causing the window hardware assembly 122 to transition from the first or unlocked position through the second or transitional position and into the third or locked position.

In the first or unlocked position shown in FIG. 12, the shoe assembly 304 is not rotated, and may freely slide between the first end 408 and the second end 410 of the body 402 of the track member 302. In the first or unlocked position, the window hardware assembly 122 allows the vent 104 to freely move toward the OPENED position. In the second or transitional position shown in FIG. 13, the shoe assembly 304 is rotated, but the second end 610 of the body 602 of the shoe assembly 304 is not yet in contact with a latching surface 518 of one of the steps 514 of the track member 302, and so the shoe assembly 304 may still slide a distance towards the second end 410 of the track member 302. However, in the third or locked position shown in FIG. 14, the shoe assembly 304 is rotated and positioned such that the second end 610 of the shoe assembly 304 is in contact with a latching surface 518, and no longer able to slide towards the second end 410 of the track member 302. Thus as the vent 104 moves toward the OPENED position under rapid acceleration, the window hardware assembly 122 may enter the third or locked position, inhibiting the vent 104 from moving further toward the OPENED position.

Figure 15A:
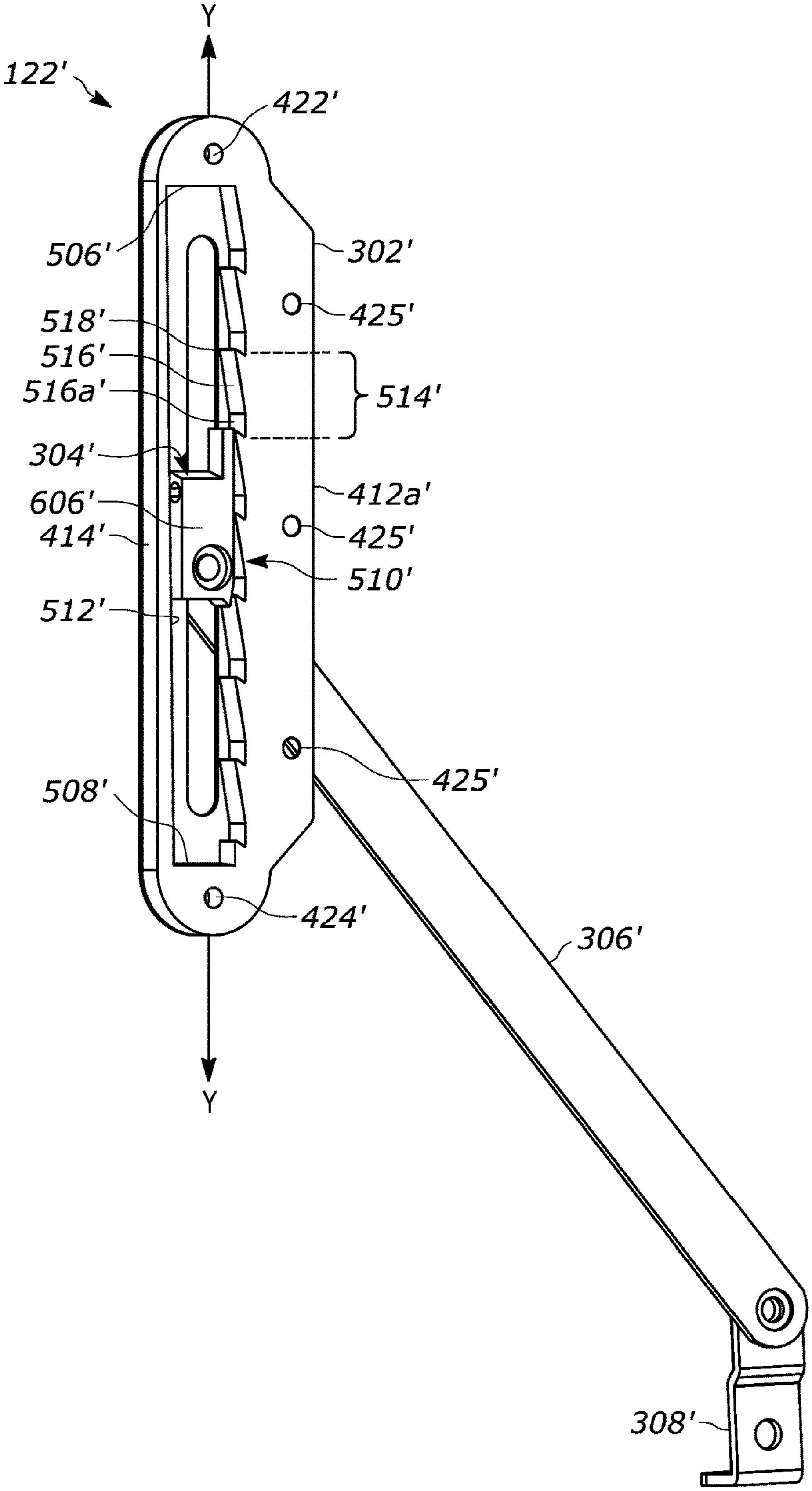
FIG. 15A is an isometric view of the interior or window frame-facing back side of an alternative vent retention apparatus or system comprising a hardware assembly in accordance with this specification.
Figure 15B:
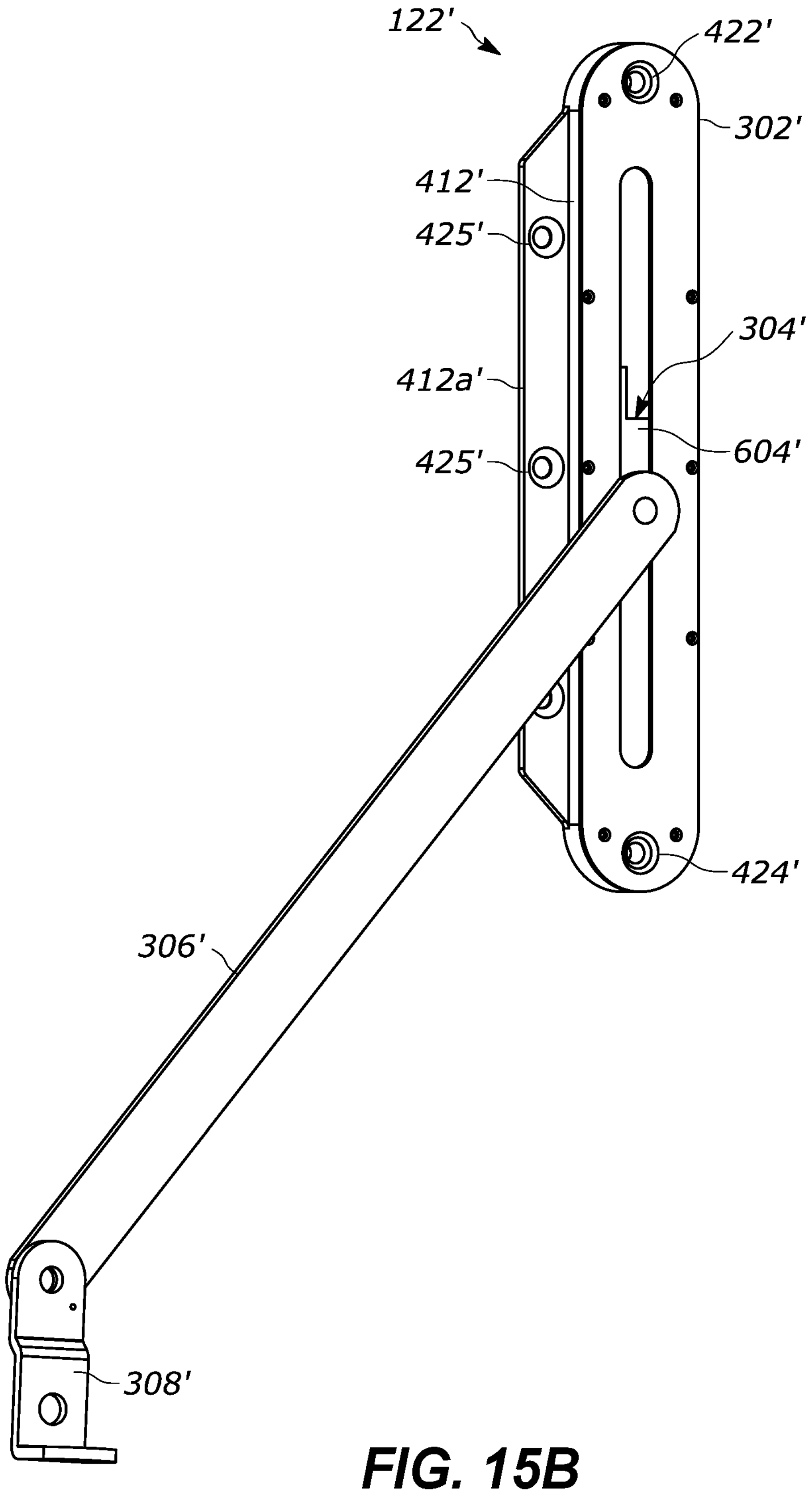
FIG. 15B is an isometric view of the exterior or window vent-facing front side of the vent retention apparatus or system of FIG. 15A.
Figure 16A:
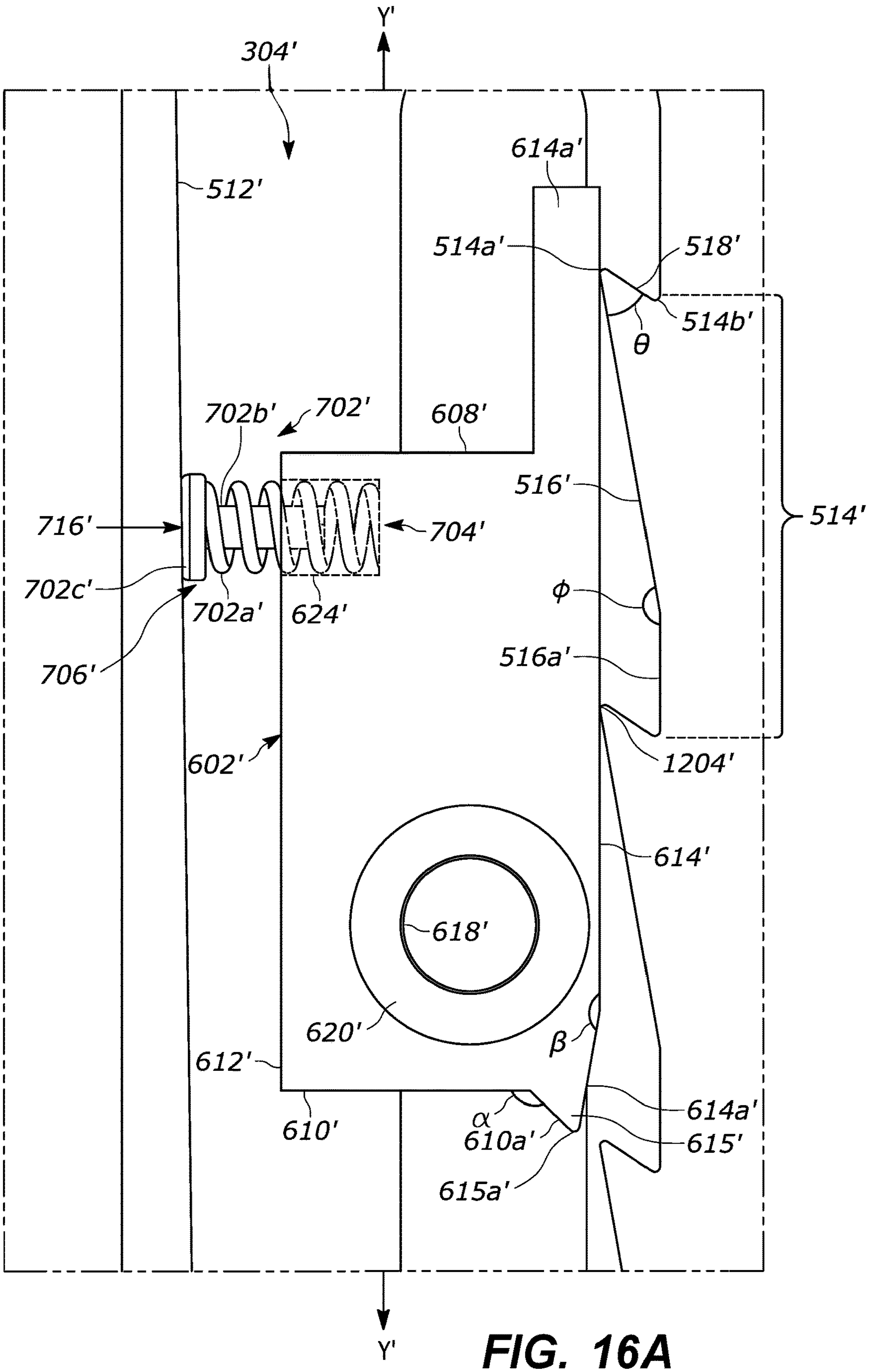
FIG. 16A is an enlarged, partial side view of the interior or frame facing side of the vent retention apparatus of FIG. 15A in a first or unlocked position.
Figure 16B:
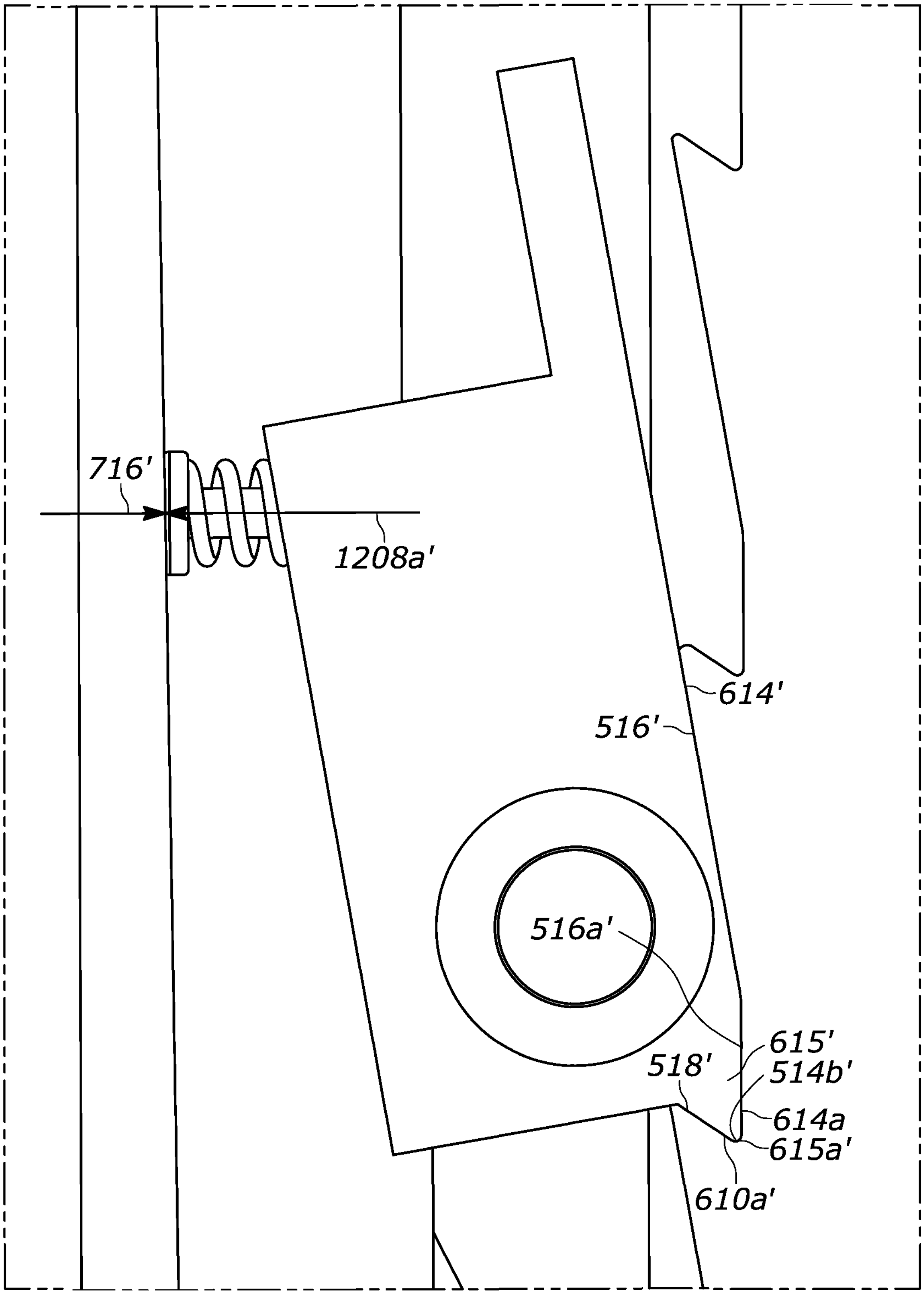
FIG. 16B is an enlarged, partial side view of the interior or frame facing side of the vent retention apparatus of FIG. 15A in a third or locked position.

Referring now to FIGS. 15A, 15B, 16A and 16B, an alternate vent retention system or window hardware assembly 122' according to the present disclosure is provided. FIG. 15A is an isometric view of the interior or window frame-facing back side of the vent retention system 122'. FIG. 15B is an isometric view of the exterior or window vent-facing front side of the vent retention system 122'. An enlarged partial side view of the interior or frame facing side of the vent retention system 122' is shown in greater detail in the first or unlocked position in FIG. 16A. FIG. 16B shows an enlarged partial side view of the interior or frame facing side of the vent retention system 122' similar to FIG. 16A, but with the vent retention system 122' shown in a third or locked position. It can be appreciated that the vent retention system 122' may include the same or similar components and/or construction, and function in a similar manner, as the vent retention system 122 previously described. Notable differences and/or further features of the vent retention system or window hardware assembly 122' are further described below.

In various implementations, the window hardware assembly 122' generally includes a track member 302', a shoe assembly 304', a linkage member 306', and an attachment member 308'. The track member 302' may be coupled or attached to the frame 102, such as at the first side jamb 110. In various implementations, the attachment member 308' may be coupled or attached to the vent 104, such as at the bottom rail 116. In various implementations, the track member 302' may be coupled to the shoe assembly 304', the shoe assembly 304' may be coupled to the linkage member 306', and the linkage member 306' may be coupled to the attachment member 308'.

As best illustrated in FIGS. 15A, 16A and 16B, a track member 302' for the vent retention system 122' includes a plurality of steps 514' that may be formed in or on and/or to comprise the first side wall 510' of the recessed portion 502'. Each step 514' may be formed by a vertical or parallel surface 516*a*', an angled surface 516' extending from the vertical or parallel surface 516*a*', and a latching surface 518' extending from the angled surface 516'.

In various implementations, each vertical or parallel surface 516*a*' may extend generally parallel to a longitudinal axis Y of the track member 302' (e.g., each vertical or parallel surface 516*a*' may be generally vertically-oriented). Each angled surface 516' may extend from the vertical surface 516*a*' in a direction upwardly and inwardly (i.e., toward the first end wall 506' and toward the second side wall 512') and form an included angle (φ) relative to the vertical or parallel surface 516*a*'. In various implementations, the included angle (φ) may be obtuse. Each angled surface 516' may terminate at a latching surface 518'. In various implementations, each latching surface 518' may extend from the angled surface 516' to the vertical or parallel surface 516*a*' of an adjacent step 514'. The latching surface 518' may extend from the angled surface 516' in a direction downwardly and outwardly (i.e., toward the second end wall 508' and away from the second side wall 512') and form an included angle (θ) with the angled surface 516'. In various implementations, the included angle (θ) may be acute.

As can be understood with reference to FIGS. 15A, 16A and 16B, in various implementations, the angled surface 516' and the latching surface 518' may cooperate to form a saw tooth-like profile for each step 514', with a peak or latch 514*a*' formed at the interface between the angled surface 516' and the latching surface 518' and a valley 514*b*' formed at interface between the latching surface 518' and the vertical or parallel surface 516*a*' of an adjacent step 514'. In some implementations, each of the peaks 514*a*' and valleys 514*b*' of the steps 514' may be chamfered or radiused so as to eliminate any sharp edges or corners and help promote the smooth operation of the vent retention system 122'.

With further reference to FIGS. 15A and 15B, in various implementations of the track member 302', a flange portion 412*a*' extend laterally outwardly from the first side 412' of the track member 302'. The flange portion 412*a*' may increase the overall width of the track member 302' to, e.g., more closely fit within the side jamb 110 of the window frame 102. In addition, the flange portion 412*a*' can include a one or more mounting apertures 425'. The mounting apertures 425' providing additional locations to secure the track member 302' to the window frame 102. For example, nails, screws, or rivets received through apertures 425' in addition to, or alternatively to, the apertures 422' and 424' of the track member 302'.

With further reference to FIGS. 15A, 15B, 16A and 16B, a shoe assembly 304' for the vent retention system 122' is illustrated. The shoe assembly 304' may include a body 602' having a first face 604' opposite a second face 606', a first or upper end 608' opposite a second or lower end 610', and a first side 612' opposite a second side 614'. In various implementations, an opening, for example, aperture 618' may extend from the first face 604' to the second face 606'. A recessed portion or cavity, such as recessed portion 620', may be formed in the second face 606'. In various implementations, the profile of the aperture 618' may be concentric with the profile of the recessed portion 620' in the plane parallel to the plane of the first face 604' and/or the second face 606'.

In various implementations, the second side 614' may extend past the upper end 608' and may form an extension portion 614*a*'. The extension portion 614*a*' increases the overall length of the body 602' of the shoe assembly 304'. The extension portion 614*a*' enables the shoe assembly 304', particularly in the unlocked position, to maintain contact against the first side wall 510' of the track member 302' over a plurality of steps 514'. The extension portion 614*a*' helps promote the smooth operation of the vent retention system 122'.

As best seen in FIGS. 16A and 16B, the shoe assembly 304' may further include a biasing member 702'. The spring member may, for example, include a linear or non-linear spring. For example, the spring may be a compression spring. The spring may be positioned toward an upper or first end 608' of the shoe body 602' and further from the pivot or fulcrum (e.g., 1204'). The biasing member 702' may provide greater variability in the resultant torque it can apply to the body 602'.

In various implementations, biasing member 702' may include a compression spring 702*a*'. The compression spring 702*a*' may be formed of steel. In various implementations, the biasing member 702' may also include a guide rod 702*b*'. The compression spring 702*a*' may be arranged over the guide rod 702*b*'. The guide rod 702*b*' may assist in preventing the compression spring 702*a*' from buckling under a working load 716'. In various implementations of the biasing member 702', an end cap 702*c*' may also be included and attached to an end of the guide rod 702*b*'. The end cap 702*c*' may cover a second or distal end 706' of the biasing member 702' so as to capture the compression spring 702*a*' between the body 602' and the second side wall 512'. The end cap 702*c*' may be configured to abut and/or travel along the second side wall 512' of the track member 302'. The end cap 702*c*' may be integral with the guide rod 702*b*'.

In various implementations, the first or proximal end 704' of the biasing member 702' may be received in a blind aperture 624' in the second side 614' of the body 602'. The aperture 624' may be located nearer to the first end 608' of the body 602'. The second or distal end 706' of the biasing member 702' may extend substantially laterally outward from the second side 614' of the body 602' to the second side wall 512' of the track member 302'. In various implementations, the biasing member 702' may extend substantially perpendicularly to the second side 614' of the body 602'.

When a working load 716' is applied to the biasing member 702', the biasing member 702' may compress such that the length of the biasing member 702' is reduced. See, e.g., FIG. 16B. The biasing member 702' can produce a spring force 1208*a*' opposing the working load 716'.

In various implementations, the body 602' of the shoe assembly 304' may include a generally triangular-shaped projection or tooth-like catch 615' extending downwardly from the body 602'. For example, the catch 615' may extend from the second end 610' and second side 614' of the body 602'. In various implementations, the catch 615' may be formed by a first surface 610*a*' adjacent to and extending from the second end 610' of the body 602' and a second surface 614*a*' adjacent to and extending from the second side 614' of the body 602'. As best seen in FIG. 16A, the first surface 610*a*' may extend downwardly and outwardly from the second end 610' and form an included angle (α) with the second end 610'. In various implementations, the included angle (α) may be obtuse. Also shown in FIG. 16A, the second surface 614*a*' may be extend downwardly and inwardly from the second side 614' and form an included angle (β) with the second side 614'. In various implementations, the included angle (β) may be obtuse. In various implementations, the included angle (β) may be less than 180 degrees. In various implementations, the included angle (β) may be between about 150 and 175 degrees.

The distal end or peak 615*a*' of the catch 615' may be radiused to eliminate any sharp edges or corners and help promote the smooth operation of the vent retention system 122'.

FIG. 16B shows an enlarged, partial side view of the interior or frame facing side of the vent retention apparatus of FIG. 15A in a third or locked position. As such, when the vent 104 moves toward the OPENED position under rapid acceleration, the window hardware assembly 122' may enter the third or locked position, inhibiting the vent 104 from moving further toward the OPENED position.

FIG. 16B shows the shoe assembly 304' is sufficiently pivoted and positioned such that the second end 610' of the shoe assembly 304' is in contact with a step 514' and no longer able to slide in the track member 302' towards the second end 410' of the track member 302'. More specifically, a valley 514*b*' of the track member 302' engages the catch 615' of the shoe assembly 304'. For example, the first surface 610*a*' of the catch 615' engages the latching surface 518' of the step 514'. If, however, the shoe assembly 304' does not pivot enough to be captured by a step 514', then the respective radiused or chamfered peak 615*a*' of the catch 615' and the peak 514*a*' of the step 514' allow the catch 615' to deflect and continue to slide in the track member 302' for the smooth operation of the vent retention system 122'.

Figure 17:
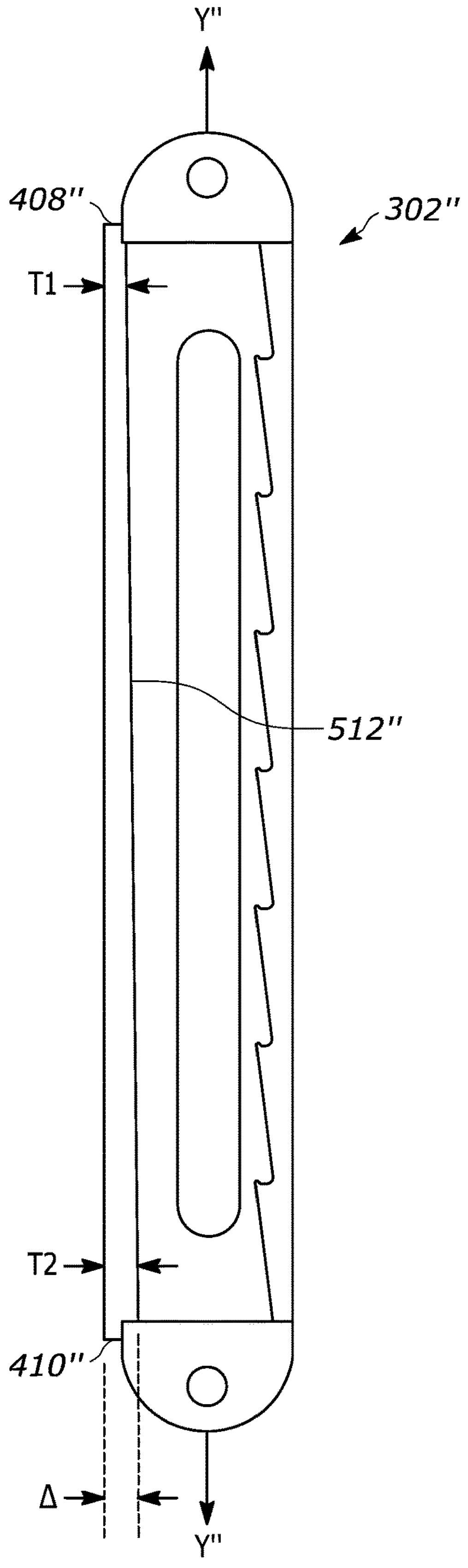
FIG. 17 is a side view of a track member for a vent retention apparatus or system comprising a hardware assembly in accordance with this specification.

With reference to FIG. 17, in still a further implementations of the vent retention system 122, 122', a track member 302" may be provided to include a tapered or sloped side wall. More particularly, the second side wall 512" of the track member 302" may be angled, tapered, or sloped between the first end 408" and the second end 410". For example, the second side wall 512" may have a first thickness T1 at the first end 408" and a second thickness T2 at the second end 410'. As such, the second side wall 512" may be angled relative to the longitudinal axis Y" of the track member 302". In some implementations, the angle of the taper (Δ) may be less than 5 degrees. More particularly, the angle of the taper (Δ) may be about 1.5 degrees.

In order to help ensure that the vent retention system 122, 122' does not inhibit normal operation of the vent window (i.e., not opening the vent under rapid acceleration), particularly when the window is opened to a greater angle, the track member 302" may be provided.

As shown in FIG. 17, the second side wall 512" of the track member 302" including taper angle (Δ) may reduce the amount of spring compression as the vent 104 moves to the CLOSED position. When the vent 104 is fully CLOSED and more of the load from the vent 104 is acting on the shoe assembly 304, 304' normal to the longitudinal axis Y" of the track member 302", there is less spring compression (and therefore less spring force). This condition makes it easier to pivot the shoe assembly 304, 304' to allow the catch 615' to be captured by a step 514" and the vent retention system 122, 122' to operate as needed. This ensures that the torque to activate the vent retention system 122, 122' is sufficiently low when the vent 104 is mostly closed.

Then, as the vent 104 moves toward the OPENED position, and the shoe assembly 304, 304' moves further along the track member 302" toward the second end 410", the spring compression increases, making it harder to pivot the shoe assembly 304, 304'. Thus, vent retention system 122, 122' will be inhibited from inadvertently activating when the vent window is being operated under normal conditions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms “a,” “an,” and “the” may be intended to include the plural forms as well, unless the context clearly indicates otherwise. The terms “comprises,” “comprising,” “including,” and “having,” are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being “on,” “engaged to,” “connected to,” or “coupled to” another element or layer, it may be directly on, engaged, connected or coupled to the other element or layer, or intervening elements or layers may be present. In contrast, when an element is referred to as being “directly on,” “directly engaged to,” “directly connected to,” or “directly coupled to” another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

What is claimed is:

1. A motion-activated stop for a vent window comprising a window frame and a vent disposed in the window frame and moveable toward an opened position in response to an opening force being applied to the vent, the motion-activated stop comprising:

a connector configured to attach to the vent;

a link comprising a first end and a second end, wherein the first end is pivotally coupled to the connector;

a track configured to attach to the window frame, the track extending along a longitudinal direction and comprising:

a recessed portion comprising a first wall and a second wall, the first wall being opposite the second wall and the second wall comprising a plurality of steps;

a shoe assembly received in the recessed portion of the track and configured to be movable along the track in a first direction when the vent is moved toward the opened position, the shoe assembly comprising:

a body extending along the longitudinal direction from a first body end to a second body end;

a biasing member comprising a proximal end engaging the body and a distal end engaging the first wall of the recessed portion, wherein the biasing member applies a first force to the body at a first location to create a first torque acting on the body, the first torque having a first rotational direction; and a retaining pin coupled to the body and spaced from the first location along the longitudinal direction, wherein the second end of the link is pivotally coupled to the retaining pin;

wherein, when the opening force is applied the vent, the link is configured to transfer a second force to the retaining pin to create a second torque acting on the body, the second torque having a second rotational direction that is opposed to the first rotational direction; and wherein, when the opening force applied the vent exceeds a predetermined value such that the second torque is greater than the first torque, the body of the shoe assembly rotates in the second rotational direction from an unlocked position to a locked position and the shoe assembly is prevented from moving along the track in the first direction.

2. The motion-activated stop of claim 1, wherein in the locked position the second end of the body engages a step of the plurality of steps.

3. The motion-activated stop of claim 2, wherein each step of the plurality of steps comprises an angled surface and a latching surface;

wherein the body of the shoe assembly comprises a surface at the second end of the body; and wherein, in the locked position, a bottom surface of the body engages the latching surface of the step of the plurality of steps.

4. The motion-activated stop of claim 2, wherein each step of the plurality of steps comprises a first surface, an angled surface extending from the first surface and a latching surface extending from the angled surface;

wherein the body of the shoe assembly comprises a projection extending from the second end of the body; and wherein, in the locked position, the projection engages the latching surface of a step of the plurality of steps.

5. The motion-activated stop of claim 4, wherein the first surface and the angled surface form an included angle φ, wherein $90° < \varphi < 180°$.

6. The motion-activated stop of claim 4, wherein the angled surface and the latching surface form an included angle δ, wherein $\theta < 90°$.

7. The motion-activated stop of claim 4, wherein the first surface extends generally parallel to the longitudinal direction.

8. The motion-activated stop of claim 4, wherein the projection comprises a first extending surface extending from the second end of the body and a second extending surface extending from a second side of the body.

9. The motion-activated stop of claim 8, wherein the first extending surface extending from the second end of the body forms an included angle (α) with the second end of the body.

10. The motion-activated stop of claim 9, wherein the included angle (α) is obtuse.

11. The motion-activated stop of claim 8, wherein the second extending surface extending from the second side of the body forms an included angle (β) with the second side of the body.

12. The motion-activated stop of claim 11, wherein the included angle (β) is obtuse.

13. The motion-activated stop of claim 12, wherein the included angle (β) is less than 180 degrees.

14. The motion-activated stop of claim 12, wherein the included angle (β) is between about 150 and 175 degrees.

15. The motion-activated stop of claim 8, wherein the projection is generally triangular shaped.

16. The motion-activated stop of claim 8, wherein, in the locked position, the first extending surface of the projection extending from the second end of the body engages the latching surface of the step of the plurality of steps.

17. The motion-activated stop of claim 2, wherein the plurality of steps comprise a plurality of peaks and a plurality of valleys;

wherein the body of the shoe assembly comprises a projection extending from the second end of the body; and wherein, in the locked position, the projection engages at least one of a peak and a valley.

18. The motion-activated stop of claim 1, wherein the body of the shoe assembly comprises a first side and a second side;

wherein the biasing member applies the first force to first side of the body; and wherein, in the unlocked position, the second side of the body maintains contact with the first wall of the recessed portion over a plurality of steps.

19. The motion-activated stop of claim 18, wherein the biasing member comprises one of a linear wave spring and a compression spring.

20. The motion-activated stop of claim 18, wherein the biasing member comprises a compression spring, a guide rod and an end cap;

wherein the compression spring is arranged over the guide rod;

wherein a distal end of the compression spring is covered by the end cap; and wherein a proximal end of the compression spring is received in an aperture in the first side of the body.

21. The motion-activated stop of claim 1, wherein the second wall of the track is tapered at an angle (Δ) between a first track end and a second track end.

22. The motion-activated stop of claim 21, wherein the angle (Δ) is less than about 5 degrees.

23. The motion-activated stop of claim 21, wherein the angle (Δ) is about 1.5 degrees.

24. The motion-activated stop of claim 21, wherein the second wall has a first thickness T1 at the first track end and a second thickness T2 at the second track end.

25. The motion-activated stop of claim 21, wherein the second wall is angled relative to a longitudinal axis of the track.

26. The motion-activated stop of claim 1, wherein the track comprises a first aperture extending through the recessed portion;

wherein the body comprises a second aperture extending through the body; and wherein the retaining pin is received in the first aperture and the second aperture and slidably couples the shoe assembly to the track.

27. A vent window assembly comprising the motion-activated stop of claim 1.

28. The motion-activated stop of claim 1, wherein the body of the shoe assembly further comprises:

a first face and a second face, the first face being opposite to the second face;

an aperture formed through the body and extending from the first face to the second face, wherein the retaining pin is received in the aperture;

a recessed portion formed in the first face of the body, the recessed portion concentric with the aperture; and a plurality of cutouts formed on a first side of the body; and wherein the biasing member comprises a linear wave spring that is coupled to the body by the plurality of cutouts.

29. The motion-activated stop of claim 28, wherein the plurality of cutouts comprises a first cutout and a second cutout; and wherein the linear wave spring comprises a first spring end and a second spring end, wherein the first spring end is retained in the first cutout and the second spring end is retained in the second cutout.

30. A system for immobilizing a window sash in response to a force applied to the window sash, comprising:

a first member comprising a recessed portion, the recessed portion having a first wall opposite a second wall formed by a plurality of steps, each step of the plurality of steps comprises a latching surface;

a second member comprising a first side opposite a second side, and a top surface opposite a bottom surface, the second member slidably received within the recessed portion;

a spring member coupled to the first side of the second member, the spring member in contact with the first wall; and a pin received through an aperture formed in the second member;

wherein the spring member biases the second member away from the first wall such that the second side of the second member is in contact with at least one apex of the plurality of steps;

wherein the second member is configured to rotate in response to the force being applied to the window sash when the force exceeds a threshold;

wherein the second member is configured to slide freely within the recessed portion when the second member is not rotated; and wherein the bottom surface of the second member is configured to catch on the latching surface of one of the plurality of steps when the second member is rotated.

31. The system of claim 30, further comprising:

a linear member having a first end and a second end, wherein the linear member is pivotally coupled to the pin at the first end; and a connecting member pivotally coupled to the linear member at the second end;

wherein the connecting member is configured to be attached to the window sash; and wherein the force applied to the window sash is transmitted from the window sash to the connecting member, from the connecting member to the linear member, and from the linear member to the pin.

* * * * *